United States Patent
Demuth et al.

(10) Patent No.: US 12,271,993 B2
(45) Date of Patent: Apr. 8, 2025

(54) METHOD FOR FORMING AN IMAGE OF AN OBJECT, COMPUTER PROGRAM PRODUCT AND IMAGE FORMING SYSTEM FOR CARRYING OUT THE METHOD

(71) Applicant: Carl Zeiss AG, Oberkochen (DE)

(72) Inventors: Jonathan Demuth, Oberkochen (DE); Christophe Casenave, Aalen (DE)

(73) Assignee: Carl Zeiss AG, Oberkochen (DE)

( * ) Notice: Subject to any disclaimer, the term of this patent is extended or adjusted under 35 U.S.C. 154(b) by 0 days.

(21) Appl. No.: 17/711,969

(22) Filed: Apr. 1, 2022

(65) Prior Publication Data

US 2022/0398803 A1   Dec. 15, 2022

(30) Foreign Application Priority Data

Apr. 1, 2021   (EP) .................................... 21166594

(51) Int. Cl.
*G06T 15/20* (2011.01)
*G06F 21/62* (2013.01)
(Continued)

(52) U.S. Cl.
CPC .......... *G06T 15/20* (2013.01); *G06F 21/6209* (2013.01); *G06T 5/80* (2024.01); *G06T 15/506* (2013.01)

(58) Field of Classification Search
CPC ......... G06T 15/20; G06T 15/506; G06T 5/80; G06F 21/6209
See application file for complete search history.

(56) References Cited

U.S. PATENT DOCUMENTS 12,008,708 B2   6/2024   Wick et al.
2004/0107218 A1*  6/2004   Herold ................... G16H 10/60
(Continued)

FOREIGN PATENT DOCUMENTS

CN   1982934 A    6/2007
CN   103460223 A  12/2013
(Continued)

OTHER PUBLICATIONS

European Search Report dated Sep. 27, 2021 of European counterpart application No. EP 21166594.8 and English translation thereof.
(Continued)

*Primary Examiner* — Michelle Chin
(74) *Attorney, Agent, or Firm* — Ewers IP Law PLLC; Falk Ewers

(57) ABSTRACT

A method for forming an image of an object, a computer program product, and an image forming system for carrying out the method are provided. In the method, data about the object are provided by a first data processing device, and a first data record with first data is provided. The first data record is loaded from the first data processing device into a second data processing device. A second data record is loaded from a data memory into the second data processing device in dependence on the first data record loaded into the second data processing device. A processing data record is generated or detected based on the second data record. A two-dimensional output image of the object is generated by processing the data about the object with the processing data record, the output image having a predeterminable number of output image pixels.

22 Claims, 11 Drawing Sheets

(51) Int. Cl.
    *G06T 5/80*    (2024.01)
    *G06T 15/50*   (2011.01)

(56) References Cited

U.S. PATENT DOCUMENTS

| | | | |
|---|---|---|---|
| 2007/0132863 A1 | 6/2007 | Deguchi | |
| 2008/0037036 A1* | 2/2008 | Togami | H04N 1/33392 |
| | | | 358/1.1 |
| 2012/0207401 A1 | 8/2012 | Archer | |
| 2016/0198146 A1 | 7/2016 | Hayasaka et al. | |
| 2018/0302567 A1 | 10/2018 | Watanabe | |
| 2020/0137379 A1 | 4/2020 | Tsunashima | |
| 2021/0150804 A1 | 5/2021 | Wick et al. | |
| 2022/0398803 A1 | 12/2022 | Demuth et al. | |

FOREIGN PATENT DOCUMENTS

| | | |
|---|---|---|
| CN | 105518740 A | 4/2016 |
| CN | 105872547 A | 8/2016 |
| CN | 108737726 A | 11/2018 |
| CN | 110675348 A | 1/2020 |
| CN | 110785789 A | 2/2020 |
| CN | 112513933 A | 3/2021 |
| EP | 3035282 A1 | 6/2016 |
| JP | 2016045815 A | 4/2016 |
| JP | 2018525692 A | 9/2018 |
| KR | 20190008944 A | 1/2019 |
| WO | 2016205175 A1 | 12/2016 |
| WO | WO2017204175 A1 | 11/2017 |
| WO | 2020021121 A1 | 1/2020 |

OTHER PUBLICATIONS

Australian Examination Report dated Jan. 4, 2023 of Australian counterpart application No. 2022202187.
Office Action dated Dec. 20, 2022 issued in Korean counterpart application No. 10-2022-0040101 and English-language translation thereof.
Office Action dated Oct. 26, 2023, issued by New Zealand Intellectual Property Office in counterpart application No. 786795, in English.
Office Action dated Jul. 18, 2023, issued in Canadian counterpart application No. 3,154,316 in English.
Office Action dated Jan. 22, 2025 issued in China counterpart application No. 202210348631.7 and English-language translation thereof.
Office Action dated Jan. 20, 2025, issued in Canadian counterpart application No. 3,154,316 in English.

* cited by examiner

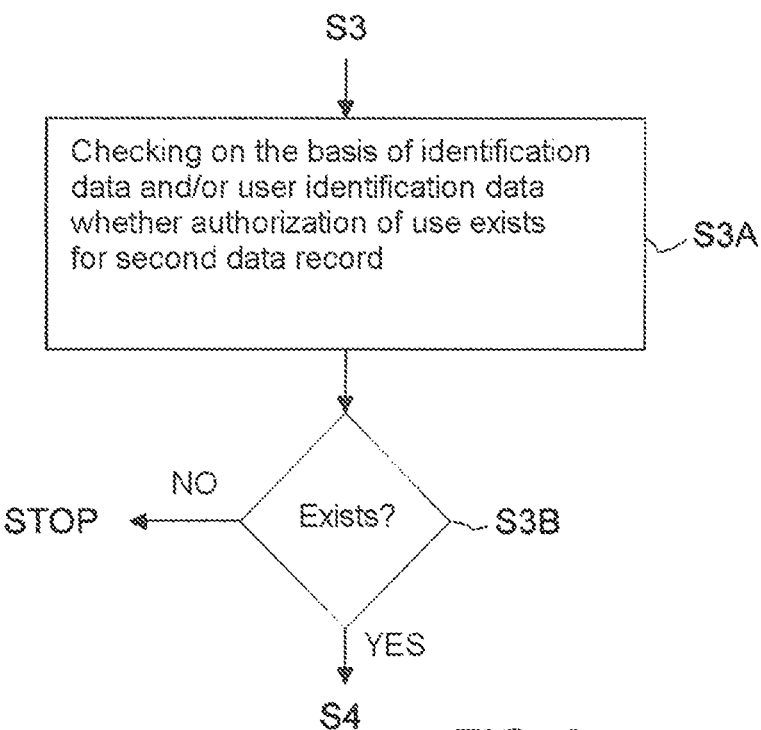

METHOD FOR FORMING AN IMAGE OF AN OBJECT, COMPUTER PROGRAM PRODUCT AND IMAGE FORMING SYSTEM FOR CARRYING OUT THE METHOD

CROSS REFERENCE TO RELATED APPLICATIONS

This application claims priority to European patent application EP 21 166 594.8, filed in the German language on Apr. 1, 2021, the entire content of which is incorporated herein by reference.

TECHNICAL FIELD

The disclosure relates to a method for forming an image of an object, to a computer program product and to an image forming system for carrying out the method.

BACKGROUND

It has already been known for some time to form images with an optical imaging system, the optical imaging system having an objective lens and an image capturing unit. The image capturing unit is formed for example as an electronic image sensor. In particular, the electronic image sensor is formed as a digital image capturing unit, for example in the form of a complementary metal-oxide-semiconductor (CMOS). As an alternative, it is provided that the image capturing unit is formed as a light-sensitive chemical film. An image sequence, which includes a plurality of images, can also be formed with the known optical imaging system. The image formed with the known optical imaging system is also referred to hereinafter as the actually formed image. Furthermore, the image sequence formed with the known optical imaging system is also referred to hereinafter as the actually formed image sequence.

The known optical imaging system is formed for example as a camera. In particular, it is provided that the camera is formed as a film camera which is used in the area of cinematography. As an alternative, it is provided that the camera is formed as a camera which is used in the area of photography.

The objective lens of the aforementioned camera has at least one lens unit and at least one stop unit, which is provided with an aperture. For example, the objective lens has at least one lens group, which is moved along an optical axis of the objective lens for setting the focusing of the objective on the object and/or for setting a focal length of the objective lens. A lens group is understood hereinbefore and hereinafter as meaning a group which has a single lens element or a plurality of lens elements. In addition, the lens group may also have at least one prism.

The image actually formed with the known optical imaging system generally has imaging errors, for example on account of a spherical aberration, a geometric distortion and/or vignetting. In this case, the geometric distortion is essentially a distortion of straight lines within the image. Vignetting is a reduction in light towards the periphery, that is to say shading towards an edge of the image. Actually formed image sequences can also have the aforementioned imaging errors.

In photography and in cinematography, there are known stylistic devices for directing the attention of a viewer of an image or a film to specific contents of an image or to specially modify these contents of the image for a viewer to achieve a sophisticated aesthetic impression. In order to achieve this, it is known from the prior art to form an image of an object by using a very special objective lens or objective special lenses. For example, objective lenses with a large aperture are advantageous in photography and cinematography not only because of the high lens speed but also because they can form images with a shallow depth of field. The depth of field is a region in front of an objective lens of a camera, with the objective lens being used for imaging an object. If an object is located within this region—i.e. within the depth of field—it is imaged in focus by the objective lens. An object located in this region is represented in focus in the image by focusing the objective lens on this object, with the space outside the depth of field in effect becoming blurry on account of the unsharpness in the image. As a result, the attention of a viewer is directed towards the sharp image region of the object. Expressed differently, it is possible to image an object sharply by focusing the objective lens on a very special object plane, to be precise while simultaneously imaging the portions of the object in front of and behind the object plane out of focus. These portions are imaged out of focus.

As mentioned above, the stylistic devices are used to achieve a good aesthetic impression. For example, it is often desired that specific regions of an object assume a specific form in the image. Thus, for example, it is often desired that strong, local light sources that are part of an object to be imaged and lie significantly outside a focused object plane are represented in the image as homogeneous circular discs. The form and imaging quality of these specific regions of the object in the image are also referred to by those skilled in the art as bokeh. Bokeh describes an (albeit subjective) aesthetic quality of out-of-focus regions in an image of an object. In this case, bokeh does not refer to the degree to which they are out of focus, but to the form and nature of the imaged regions of the object in the image.

It is known from the prior art that a computer graphic designer can generate a three-dimensional scene that has a sequence of a plurality of three-dimensional representations and/or generate a three-dimensional representation by mathematical calculation of data. These data are then used to convert this three-dimensional scene into a two-dimensional image sequence and/or to convert the three-dimensional representation into a two-dimensional image. This method is also known as rendering. In order to generate the three-dimensional scene and/or the three-dimensional representation, the computer graphic designer uses a mathematical model of the three-dimensional scene and/or of the three-dimensional representation. The mathematical model includes for example parameters which describe in particular the form, the colour and the surface finish of an object to be modelled which is to be represented in the three-dimensional scene and/or in the three-dimensional representation. Furthermore, the mathematical model includes for example parameters which describe the illumination of the object, in particular the location, the type, the color and the direction of light sources to be modelled. In addition, the mathematical model includes the position of the object in the three-dimensional scene and/or in the three-dimensional representation at least one of the following: the capturing direction, the field of view, the focal length, the focusing, the image format, the size of the image capturing unit, the position and the path of movement of a virtual camera. On the basis of these parameters, the two-dimensional image and/or the two-dimensional image sequence can be calculated. For this calculation, it is often assumed that the virtual camera is formed as a pinhole camera, the imaging of which can be calculated according to the intercept theorem. Since, in principle, a pinhole camera does not have any imaging errors, the calculated two-dimensional image and/or the calculated two-dimensional image sequence is/are free from image errors.

It is also known from the prior art to mix the two-dimensional images or two-dimensional image sequences formed by rendering—that is to say essentially artificially—with images and/or image sequences that have been formed with an optical imaging system, for example a film camera. The aforementioned mixing may include the creation of effects which are referred to in 3D computer graphics and cinematography as "visual effects" (often abbreviated as VFX). The aforementioned mixing is also referred to as augmentation. Augmentation takes place for example during post production of a cinematographic film, in particular in so-called compositing, in which images that originate from different sources are combined. It is desirable that the two-dimensional images and/or image sequences formed by rendering in a mixed image generated by compositing and/or in a mixed image sequence generated by compositing do not have any discernible differences, or only minor discernible differences, from the actually formed images and/or image sequences, in order to convey a good aesthetic impression and also an as realistic as possible impression of an object or a scene.

It is also known from the prior art not to mix the two-dimensional images or two-dimensional image sequences formed—essentially artificially—by rendering, but to use them for fully animated images and/or image sequences. This is used for example in the production of animated films and/or in the area of virtual reality, virtual reality being used for example in computer games, in-flight simulators for pilot training, ship simulators for skipper training and/or train simulators for train driver training. It is also desirable that the two-dimensional images and/or image sequences formed—essentially artificially—by rendering have no discernible differences, or only just discernible differences, from actually formed images and/or image sequences, in order to convey a good aesthetic impression and also an as realistic as possible impression of an object or a scene.

SUMMARY

It is an object of the disclosure to provide a method for forming an image of an object and an image forming system for carrying out the method by which on the one hand imaging errors in actually formed images and/or image sequences are modified and by which on the other hand artificially formed representations of an object have no discernible differences, or only just discernible differences, from actually formed images and/or image sequences.

The object is achieved by methods for forming an image of an object, and a non-transitory computer-readable storage medium with a program code stored thereon which can be loaded into a processor of an image forming system and, when it has been loaded in the processor, during its execution controls the image forming system in such a way that a method according to an aspect of the disclosure is carried out. Furthermore, the disclosure relates to an image forming system for forming an image of an object. Further features of the disclosure emerge from the following description, and/or the appended drawings.

The disclosure relates to a method for forming an image of an object. In the method according to the disclosure, data about the object are provided by a first data processing device. In this case, the data about the object are understood hereinbefore and hereinafter as any data that describe the object. For example, the data about the object are at least one two-dimensional input image of the object. In addition or as an alternative, the data about the object are for example at least one three-dimensional representation of the object. Both exemplary embodiments of the data about the object are discussed in more detail further below. Again, in addition or as an alternative, it is provided that the data about the object are data with which a multidimensional, for example a two-dimensional or three-dimensional, representation of the object can be calculated. The aforementioned enumeration of data about the object should not be understood as exhaustive. Rather, any data about the object that describe the object and are suitable for carrying out the disclosure may be used. Examples of how these data about the object can be obtained are explained further below.

The first data processing device is for example an electronic system which is formed by a central unit and peripheral devices. For example, the central unit is a local computer, a server unit, a network with a plurality of workstations, a cloud-based virtual server, a tablet computer and/or a smartphone. The peripheral devices are formed for example as an input and/or output unit, in particular in the form of a keyboard, and/or as a monitor.

The method according to an aspect of the disclosure also includes providing at least one first data record by the first data processing device. The first data record has first data, which comprise the following: (i) at least a first imaging parameter of a first imaging system with which the data about the object have been generated, and/or (ii) at least a second imaging parameter of a second imaging system with the properties of which an image of the object is intended to be represented on a display unit on the basis of the data about the object.

Consequently, the first data may include at least the first imaging parameter of the first imaging system with which the data about the object have been generated. As explained in more detail further below, first imaging parameters include for example first meta data of the first imaging system, in particular first camera data and first objective lens data. Further examples of the first data are mentioned further below.

The first imaging system is for example a first optical imaging system, which has at least one lens element. The first optical imaging system is formed for example as a camera. This is discussed in more detail further below.

In addition or as an alternative, it is provided that the first imaging system is formed as a computer graphics system with which a three-dimensional scene which has a sequence of a plurality of three-dimensional representations is generated by mathematical calculation of data. As an alternative, with the computer graphics system a three-dimensional representation is generated by mathematical calculation of data. The first data of the first data record then include for example the data generated by this mathematical calculation. In addition or as an alternative, the aforementioned mathematically calculated data are converted into a two-dimensional image sequence and/or into a two-dimensional image. Then, the first data include data of the two-dimensional image sequence and/or of the two-dimensional image.

As mentioned above, the data of a three-dimensional scene or of a three-dimensional representation are mathematically calculated. For this purpose, a computer graphic designer uses for example a mathematical model of a three-dimensional scene and/or of a three-dimensional representation. The mathematical model includes for example parameters which describe in particular the form, the color and the surface finish of an object to be modelled which is to be represented in the three-dimensional scene and/or in the three-dimensional representation. Furthermore, the mathematical model includes for example parameters which describe the illumination of the object, in particular the location, the type, the color and the direction of light sources to be modelled. In addition, the mathematical model includes the position of the object in the three-dimensional scene and/or in the three-dimensional representation at least one of the following: the capturing direction, the field of view, the focal length, the focusing, the image format, the size of the image capturing unit, the position and the path of movement of a virtual camera.

As described above, the first data may in addition or as an alternative include at least the second imaging parameter of the second imaging system. With the properties of the second imaging system, an image of the object is intended to be represented on a display unit on the basis of the data about the object. As still to be explained in more detail further below, the second imaging parameters include for example second meta data of the second imaging system, in particular first camera data and first objective lens data. Further examples of the first data are mentioned further below.

The second imaging system is for example a second optical imaging system, which has at least one lens element. The second optical imaging system is formed for example as a camera. This is discussed in more detail further below.

In addition or as an alternative, it is provided that the second imaging system is formed as a virtual camera. The at least second imaging parameter has the effect that an image of the object on the basis of the data about the object is represented on the display unit in such a way as though the virtual camera using the second imaging parameter were actually imaging the object. Expressed differently, an image of the object is intended to be formed by mathematical calculation on the basis of the data about the object and represented on the display unit in such a way as though a camera which has the property chosen by the second imaging parameter were actually imaging the object.

In the method according to an aspect of the disclosure, loading of the first data record from the first data processing device into a second data processing device also takes place. The first data processing device and the second data processing device are for example connected to one another for data exchange. In particular, it is envisaged to connect the first data processing device to the second data processing device by lines. In addition or as an alternative, it is envisaged to connect the first data processing device to the second data processing device wirelessly in such a way that a data exchange can take place. For example, the wireless connection between the first data processing device and the second data processing device is a radio connection or a connection by way of a WLAN. In addition or as an alternative, the first data processing device and the second data processing device are connected to one another by way of the Internet. The second data processing device is for example an electronic system which has a central unit. For example, the central unit is a local computer, a server unit, a network with a plurality of workstations, a cloud-based virtual server, a tablet computer and/or a smartphone. In addition, the second data processing device may for example be provided with peripheral devices. The peripheral devices are formed in particular as an input and/or output unit, for example in the form of a keyboard, and/or as a monitor.

The method according to an aspect of the disclosure also includes loading of a second data record from a data memory into the second data processing device in dependence on the first data record loaded into the second data processing device. The second data record has second data, which include the following: (i) modification data for modifying imaging errors in dependence on the first imaging parameter of the first imaging system and/or (ii) modification data for modifying the data about the object in dependence on the second imaging parameter of the second imaging system.

Consequently, the second data may include modification data for modifying imaging errors in dependence on the first imaging parameter of the first imaging system. Expressed differently, the second data include modification data which can be used to modify imaging errors which have occurred when generating the data about the object (in particular when forming the aforementioned two-dimensional input image of the object). In particular, with the modification data, the imaging errors can be reduced or increased. For example, the modification data may have correction data for correcting imaging errors in dependence on the first imaging parameter of the first imaging system. Expressed differently, the second data include correction data which can be used to reduce or completely correct imaging errors which have occurred when generating the data about the object (in particular when forming the aforementioned two-dimensional input image of the object). In addition or as an alternative, it is also envisaged to reconstruct one or more imaging errors by using the modification data. Expressed differently, an imaging error may be inserted into an image by using the modification data.

In addition or as an alternative, the second data include modification data for modifying the data about the object in dependence on the second imaging parameter of the second imaging system. Expressed differently, with the aid of the modification data, the data about the object can be modified in dependence on the second imaging parameter of the second imaging system. The modification of the data about the object takes place for example in such a way that the modification of the data about the object has the effect of forming an image of the object which essentially corresponds or substantially corresponds to an image of the object formed with the aforementioned second optical imaging system or an image of the object formed with the aforementioned virtual camera.

The second data record may be designed for example in the form of a polynomial. The polynomial represents for example a virtual camera and describes in a mathematical form how and where a light beam entering an objective lens of the virtual camera and emerging again from the objective lens is imaged on the image capturing unit of the virtual camera. For example, the polynomial has the following form:

$$x_f = \sum_{i,j,k,l,m} c_{ijklm} x_s^i y_s^j x_a^k y_a^l \beta^m$$

where $x_s$ and $y_s$ represent the beam position of the emerging light beam on a surface of the image capturing unit, $x_a$ and $y_a$ represent a beam position of the incident light beam on a plane of a virtual stop and $\beta$ is a desired imaging scale.

In the method according to an aspect of the disclosure, it is provided that a processing data record is generated in particular with the first data processing device and/or the second data processing device on the basis of the second data record. For example, the processing data record includes a correction map. As an alternative, it is provided that for example it is detected with the first data processing device and/or the second data processing device that the second data record is used unchanged as the processing data record. In particular, it is for example determined with the first data processing device and/or the second data processing device that the second data record is used unchanged as the processing data record.

In addition, in the method according to an aspect of the disclosure, it is provided that a two-dimensional output image of the object is formed, for example with the first data processing device and/or the second data processing device, by processing the data about the object by using the processing data record, the output image having a predeterminable number of output image pixels. For example, the correction map formed as the processing data record is placed over the two-dimensional input image of the object and corrections of the imaging errors are performed. The two-dimensional output image formed is then the two-dimensional input image of the object provided with the corrections. If, for example, the processing data record is formed as the second data record, in particular in the form of a polynomial, then the data about the object are processed with the processing data record in such a way that an image of the object which essentially corresponds or substantially corresponds to an image of the object formed with the aforementioned second optical imaging system or an image of the object formed with the aforementioned virtual camera is formed as the two-dimensional output image. The two-dimensional output image of the object can then be displayed on a display unit.

The disclosure provides a method for forming an image of an object by which an imaging error or a plurality of imaging errors in actually formed images and/or image sequences can be modified in an easy way. For this purpose, the disclosure always provides the appropriate processing data record with which the imaging error or the number of imaging errors in the actually formed image can be modified, in particular can be completely or substantially corrected. In addition, the disclosure ensures that artificially generated representations of an object have no discernible differences, or only just discernible differences, from actually formed images and/or image sequences. Also, for this purpose, the appropriate processing data record with which the artificially generated representation of the object can be correspondingly processed is always provided.

In one exemplary embodiment of the method according to an aspect of the disclosure, it is additionally or alternatively provided that the second data record is loaded from the second data processing device into the first data processing device. In addition, it is provided that the first data processing device is used for generating the processing data record or detecting that the second data record is used as the processing data record.

In a further exemplary embodiment of the method according to an aspect of the disclosure, it is additionally or alternatively provided that the first data processing device is used for forming the two-dimensional output image of the object.

In yet a further exemplary embodiment of the method according to an aspect of the disclosure, it is additionally or alternatively provided that the second data processing device is used for generating the processing data record or detecting that the second data record is used as the processing data record. In addition, it is for example provided that the processing data record is loaded from the second data processing device into the first data processing device and the first data processing device is used for forming the two-dimensional output image of the object. As an alternative, it is for example provided that the second data processing device is used for forming the two-dimensional output image of the object and that the two-dimensional output image is loaded from the second data processing device into the first data processing device.

As already mentioned above, in one exemplary embodiment of the method according to an aspect of the disclosure, it is additionally or alternatively provided that the data about the object comprise at least one two-dimensional input image of the object. The input image of the object has a predetermined number of input image pixels. The two-dimensional input image is for example formed with an optical imaging system in the form of a camera. In particular, it is envisaged to store the two-dimensional input image on a data carrier, from which the first data processing device loads and provides the input image. During the forming of the output image of the object, at least one input image pixel of the predetermined number of input image pixels of the input image of the object is processed for example with the first data processing device and/or with the second data processing device by using the processing data record, pixel values of the input image pixel of the input image of the object being modified with data of the processing data record. For example, greyscale values or color values of the input image pixel are modified.

As already mentioned above, in a further exemplary embodiment of the method according to an aspect of the disclosure, it is additionally or alternatively provided that the data about the object concern at least one three-dimensional representation. The data about the object include first data contents in a first dimension, second data contents in a second dimension and third data contents in a third dimension. The disclosure is not restricted to the exemplary embodiment described above of the data about the object with regard to a three-dimensional representation. Rather, any exemplary embodiment that is suitable for the disclosure can be used, for example a three-dimensional representation that has bodies which may take any desired form. For example, the bodies are spherical, cuboidal and/or rotationally symmetric. These bodies may be joined together in particular additively or subtractively. As already mentioned above, a three-dimensional scene, which has a sequence of a plurality of three-dimensional representations, and/or a three-dimensional representation may be generated by mathematical calculation of data. For this purpose, a mathematical model of the three-dimensional scene and/or of the three-dimensional representation is used. The mathematical model includes for example parameters which describe in particular the form, the color and the surface finish of an object to be modelled which is to be represented in the three-dimensional scene and/or in the three-dimensional representation. Furthermore, the mathematical model includes for example parameters which describe the illumination of the object, in particular the location, the type, the color and the direction of light sources to be modelled. In addition, the mathematical model includes the position of the object in the three-dimensional scene and/or in the three-dimensional representation at least one of the following: the capturing direction, the field of view, the focal length, the focusing, the image format, the size of the image capturing unit, the position and the path of movement of a virtual camera. During the forming of the output image of the object, for example the first data content, the second data content and/or the third data content is/are processed for example with the first data processing device and/or with the second data processing device by using the processing data record, with the first data content, the second data content and/or the third data content being modified with data of the processing data record.

As already mentioned above, in yet a further exemplary embodiment of the method according to an aspect of the disclosure, it is additionally or alternatively provided that a first optical imaging system is used as the first imaging system. For example, the first optical imaging system has a first objective lens and a first image capturing unit. The first image capturing unit is formed for example as an electronic image sensor. In particular, the electronic image sensor is formed as a digital image capturing unit, for example in the form of a CMOS. As an alternative to this, it is provided that the image capturing unit is formed as a light-sensitive chemical film. The first optical imaging system is formed for example as a camera. In particular, it is provided that the camera is formed as a film camera which is used in the area of cinematography. As an alternative, it is provided that the camera is formed as a camera which is used in the area of photography. The first objective lens has at least one lens unit and at least one stop unit, which is provided with an aperture. For example, the first objective lens has at least one lens group, which is moved along an optical axis of the first objective lens for setting the focusing of the first objective lens on the object and/or for setting a focal length of the first objective lens. A lens group is understood hereinbefore and hereinafter as meaning a group which has a single lens element or a plurality of lens elements. In addition, the lens group may also have at least one prism.

In a further exemplary embodiment of the method according to an aspect of the disclosure, it is additionally or alternatively provided that first meta data of the first imaging system are used as the first imaging parameter. The first meta data include for example imaging properties and/or functional units of the first imaging system. The first meta data are in particular automatically read out by the first data processing device from the data about the object or from data corresponding to the properties of the first imaging system or are manually input into the first data processing device. For example, at least one of the following parameters is used as the first imaging parameter:

first camera data about a first camera with which the data about the object have been generated;
first objective lens data about a first objective lens with which the data about the object have been generated;
first stop unit data about a first stop unit with which the data about the object have been generated;
first focusing unit data about a first focusing unit with which the data about the object have been generated;
first focal-length setting unit data about a first focal-length setting unit with which the data about the object have been generated;
first information about a position and a location of the first imaging system in space. Expressed differently, first information about the position and the alignment of the first imaging system for example in three-dimensional space is provided; and
first information about a resolution of the first imaging system. Expressed differently, the resolution with which the data about the object have been generated is provided. For example, the resolution is a so-called "full HD" resolution, that is to say in particular a resolution of 1920×1080 pixels. In addition or as an alternative, the resolution is a so-called 2 k resolution, that is to say in particular a resolution of 2560×1440 pixels. However, the disclosure is not restricted to the aforementioned resolutions. Rather, any resolution that is suitable for the disclosure can be used. In addition or as an alternative, it is provided that the first information has a target resolution desired by a user, for example which can be input into the first data processing device. The target resolution may be for example one of the aforementioned resolutions.

In yet a further exemplary embodiment of the method according to an aspect of the disclosure, it is additionally or alternatively provided that a second optical imaging system is used as the second imaging system. For example, the second optical imaging system has a second objective lens and a second image capturing unit. The second image capturing unit is formed for example as an electronic image sensor. In particular, the electronic image sensor is formed as a digital image capturing unit, for example in the form of a CMOS. As an alternative, it is provided that the second image capturing unit is formed as a light-sensitive chemical film. The second optical imaging system is formed for example as a camera. In particular, it is provided that the camera is formed as a film camera which is used in the area of cinematography. As an alternative, it is provided that the camera is formed as a camera which is used in the area of photography. The second objective lens has at least one lens unit and at least one stop unit, which is provided with an aperture. For example, the second objective lens has at least one lens group, which is moved along an optical axis of the second objective lens for setting the focusing of the second objective lens on the object and/or for setting a focal length of the second objective lens. A lens group is understood hereinbefore and hereinafter as meaning a group which has a single lens element or a plurality of lens elements. In addition, the lens group may also have at least one prism.

In yet a further exemplary embodiment of the method according to an aspect of the disclosure, it is additionally or alternatively provided that second meta data of the second imaging system are used as the second imaging parameter. The second meta data include for example imaging properties and/or functional units of the second imaging system. The second meta data are in particular automatically read out by the first data processing device from the data about the object or from data corresponding to the properties of the second imaging system or are manually input into the first data processing device. For example, at least one of the following parameters are used as the second imaging parameter:

second camera data about a second camera with the properties of which the data about the object are intended to be represented on the display unit;
second objective lens data about a second objective lens with the properties of which the data about the object are intended to be represented on the display unit;
second stop unit data about a second stop unit with the properties of which the data about the object are intended to be represented on the display unit;
second focusing unit data about a second focusing unit with the properties of which the data about the object are intended to be represented on the display unit;
second focal-length setting unit data about a second focal-length setting unit with the properties of which the data about the object are intended to be represented on the display unit;
second information about a position and a location of the second imaging system in space. Expressed differently, second information about the position and the alignment of the second imaging system for example in three-dimensional space is provided; and second information about a resolution of the second imaging system. Expressed differently, the resolution with which the data about the object are intended to be represented on the display unit is provided. For example, the resolution is a so-called "full HD" resolution, that is to say in particular a resolution of 1920×1080 pixels. In addition or as an alternative, the resolution is a so-called 2 k resolution, that is to say in particular a resolution of 2560×1440 pixels. However, the disclosure is not restricted to the aforementioned resolutions. Rather, any resolution that is suitable for the disclosure can be used. In addition or as an alternative, it is provided that the second information has a target resolution desired by a user, in particular which can be input manually into the first data processing device. The target resolution may be for example one of the aforementioned resolutions.

In one exemplary embodiment of the method according to an aspect of the disclosure, it is additionally or alternatively provided that data for modifying a distortion of the first imaging system are used as modification data. In addition or as an alternative, it is provided that data for modifying vignetting of the first imaging system are used as modification data.

In a further exemplary embodiment of the method according to an aspect of the disclosure, it is additionally or alternatively provided that data for correcting a distortion of the first imaging system are used as modification data. In addition or as an alternative, it is provided that data for correcting vignetting of the first imaging system are used as modification data.

As already mentioned above, in one exemplary embodiment of the method according to an aspect of the disclosure, it is additionally or alternatively provided that a virtual camera is used as the second imaging system, an image of the object being formed with the virtual camera by mathematical calculation on the basis of the data about the object in such a way as though a camera which has the property chosen by the second imaging parameter were actually imaging the object. As likewise already mentioned above, in one exemplary embodiment of the method according to an aspect of the disclosure it is provided that a mathematical mapping rule, in particular a polynomial or a Fourier development, is used as the second data record, the mathematical mapping rule representing the virtual camera and describing in a mathematical form how and where a light beam entering an objective lens of the virtual camera and emerging again from the objective lens is imaged on an image capturing unit of the virtual camera. It is explicitly pointed out that the mathematical mapping rule is not restricted to the aforementioned embodiments. Rather, any mathematical mapping rule that is suitable for the disclosure can be used.

In yet a further exemplary embodiment of the method according to an aspect of the disclosure, it is additionally or alternatively provided that the first data record loaded from the first data processing device into the second data processing device has identification data of the data about the object and/or user identification data. Expressed differently, a first data record that makes a clear identification of the data about the object possible with the identification data is used. In this way it is possible for example to clearly identify a two-dimensional input image and/or data about the object that concern a three-dimensional representation. The same applies correspondingly to the user identification data. With the user identification data, it is possible to clearly identify a user of the method according to an aspect of the disclosure. For example, the user identification data include an authorization of use for carrying out the method according to an aspect of the disclosure or parts of the method according to an aspect of the disclosure. The authorization of use may exist for example whenever the user has paid to carry out the method according to an aspect of the disclosure, will pay in the near future, has been provided with a line of credit to carry out the method according to the an aspect of disclosure or has acquired a license for carrying out the method according to an aspect of the disclosure.

In yet a further exemplary embodiment of the method according to an aspect of the disclosure, it is additionally or alternatively provided that the following method step is carried out: Checking on the basis of the identification data and/or the user identification data by using the first data processing device and/or the second data processing device whether an authorization of use exists for using the second data record with the first data processing device and/or the second data processing device, and only generating the processing data record if the authorization of use exists. For example, the aforementioned method steps are carried out before generating or detecting the processing data record with the first data processing device.

In yet a further exemplary embodiment of the method according to an aspect of the disclosure, it is additionally or alternatively provided that—for example after the loading of the second data record from the second data processing device into the first data processing device—the following method steps are carried out: (i) the identification data and/or the user identification data are once again loaded from the first data processing device into the second data processing device, and (ii) it is checked on the basis of the identification data and/or the user identification data by using the second data processing device whether an authorization of use exists for using the second data record with the first data processing device and/or the second data processing device. The processing data record is only generated if the authorization of use exists. For example, the aforementioned method steps are carried out before generating or detecting the processing data record with the first data processing device.

In one exemplary embodiment of the method according to an aspect of the disclosure, it is additionally or alternatively provided that, after the forming of the two-dimensional output image of the object, the two-dimensional output image is modified once again. In this exemplary embodiment it is provided for this purpose that the second data of the second data record include modification data for modifying the formed output image of the object for incorporating imaging errors in the output image of the object in dependence on the first imaging parameter of the first imaging system. Furthermore, after being generated or detected, the processing data record has processing data on the basis of the modification data. In the exemplary embodiment of the method according to an aspect of the disclosure, it is provided that modifying of the output image of the object takes place by processing at least one output image pixel of the predeterminable number of output image pixels of the output image of the object, for example with the first data processing device and/or with the second data processing device by using the processing data, pixel values of the output image pixel of the output image of the object being modified with the processing data. In this exemplary embodiment, it is of advantage that an output image which has for example previously been completely or virtually completely corrected and is free from imaging errors is processed by incorporating imaging errors in such a way that an almost natural aesthetic impression is produced, as in the case of an actual image which has been generated with an optical imaging system.

The disclosure relates to a further method for forming an image of an object. The further method according to an aspect of the disclosure may have at least one of the features mentioned above or a combination of at least two of the features mentioned further above. In the further method according to an aspect of the disclosure, data about the object are likewise provided by a first data processing device. With regard to the data about the object and the first data processing device, reference is made to the comments made further above, which also apply here.

The further method according to an aspect of the disclosure also includes providing at least a first data record by the first data processing device. The first data record has first data, which include the following: (i) at least a first imaging parameter of a first imaging system with which the data about the object have been generated, and/or (ii) at least a second imaging parameter of a second imaging system with the properties of which an image of the object is intended to be represented on a display unit on the basis of the data about the object. With regard to the first imaging parameter, the second imaging system, the second imaging parameter and the second imaging system, reference is made to the comments made above, which also apply here.

In the further method according to an aspect of the disclosure, loading of the first data record from the first data processing device into a second data processing device also takes place. With regard to the second data processing device, reference is made to the comments made further above, which also apply here.

Furthermore, in the further method according to an aspect of the disclosure, generating of a license data record takes place in dependence on the first data record loaded into the second data processing device. The license data record is essentially an electronic key with which a suitable second data record can be decrypted (that is to say opened) in order to process the data about the object. Following that, loading of the license data record from the second data processing device into the first data processing device takes place.

The further method according to an aspect of the disclosure also includes loading of a second data record from a data memory into the first data processing device in dependence on the first data record loaded into the second data processing device. The second data record has second data, which include the following: (i) modification data for modifying imaging errors in dependence on the first imaging parameter of the first imaging system and/or (ii) modification data for modifying the data about the object in dependence on the second imaging parameter of the second imaging system. With regard to the second data record, reference is made to the comments made further above, which also apply here. In addition, in the further method according to an aspect of the disclosure, decryption of the second data record takes place by using the license data record.

Furthermore, in the further method according to an aspect of the disclosure, it is provided that the first data processing device is used for generating a processing data record on the basis of the second data record. For example, the processing data record includes a correction map. As an alternative, it is provided that it is detected with the first data processing device that the second data record is used unchanged as the data processing record.

In addition, in the further method according to an aspect of the disclosure, it is provided that a two-dimensional output image of the object is formed by processing the data about the object by using the processing data record, for example with the first data processing device and/or the second data processing device, the output image having a predeterminable number of output image pixels. For example, the correction map formed as the processing data record is placed over the two-dimensional input image of the object and corrections of the imaging errors are performed. The two-dimensional output image formed is then the two-dimensional input image of the object provided with the corrections. If, for example, the processing data record is formed as the second data record, in particular in the form of a polynomial, then the data about the object are processed with the processing data record in such a way that an image of the object which essentially corresponds or substantially corresponds to an image of the object formed with the aforementioned second optical imaging system or an image of the object formed with the aforementioned virtual camera is formed as the two-dimensional output image. The two-dimensional output image of the object can then be displayed on a display unit.

The further method according to an aspect of the disclosure also has the advantages that have already been mentioned further above. These also apply here.

The disclosure also relates to a computer program product with a program code which can be or has been partially or completely loaded into a processor of an image forming system and, when it has been loaded in the processor, during its execution controls the image forming system in such a way that a method with at least one of the features mentioned above or mentioned further below or with a combination of at least two of the features mentioned further above or further below is carried out. Expressed differently, the disclosure relates to a computer program product which can be or has been partially or completely loaded into a processor and during its execution in the processor controls an image forming system in such a way that a method with at least one of the features mentioned above or mentioned further below or with a combination of at least two of the features mentioned further above or further below is carried out.

The disclosure also relates to an image forming system for forming an image of an object. The image forming system according to an aspect of the disclosure has a display unit, which is formed for example as a monitor. However, the disclosure is not restricted to such a display unit. Rather, any display unit that is suitable for the disclosure can be used for the disclosure. Furthermore, the image forming system according to an aspect of the disclosure has a first imaging system and a second imaging system. In addition, the image forming system according to an aspect of the disclosure has a first data processing device for providing data about the object and for providing a first data record, which has first data. The first data include at least a first imaging parameter of the first imaging system with which the data about the object have been generated. In addition or as an alternative, the first data include at least a second imaging parameter of the second imaging system with the properties of which an image of the object is intended to be represented on the display unit on the basis of the data about the object. With regard to the first imaging parameter and the second imaging parameter, reference is made to the comments further above, which also apply here. Also, with regard to the first imaging system and the second imaging system, reference is made to the comments further above, which also apply here.

The first data processing device is for example an electronic system which is formed by a central unit and peripheral devices. For example, the central unit is a local computer, a server unit, a network with a plurality of workstations, a cloud-based virtual server, a tablet computer and/or a smartphone. The peripheral devices are formed for example as an input and/or output unit, in particular in the form of a keyboard, and/or as a monitor.

The image forming system according to an aspect of the disclosure has a second data processing device, which is connected to the first data processing device for data exchange. In particular, it is envisaged to connect the first data processing device to the second data processing device by lines. In addition or as an alternative, it is envisaged to connect the first data processing device to the second data processing device wirelessly in such a way that a data exchange can take place. For example, the wireless connection between the first data processing device and the second data processing device is a radio connection or a WLAN connection. In addition or as an alternative, the first data processing device and the second data processing device are connected to one another by way of the Internet. The second data processing device is for example an electronic system which has a central unit. For example, the central unit is a local computer, a server unit, a network with a plurality of workstations, a cloud-based virtual server, a tablet computer and/or a smartphone. In addition, the second data processing device may for example be provided with peripheral devices. The peripheral devices are formed in particular as an input and/or output unit, for example in the form of a keyboard, and/or as a monitor.

The image forming system according to an aspect of the disclosure additionally has a data memory, in which a second data record is stored, the second data record having second data. The second data include modification data for modifying imaging errors in dependence on the first imaging parameter of the first imaging system. For example, the modification data are data for correcting imaging errors in dependence on the first imaging parameter of the first imaging system. In addition or as an alternative, the second data have modification data for modifying the data about the object in dependence on the second imaging parameter of the second imaging system. The data memory is for example assigned to the first data processing device and/or the second data processing device. For example, it is provided that the data memory is a unit of the first data processing device and/or of the second data processing device. The location of the data memory does not have to be identical to the location of the first data processing device and/or of the second data processing device. Rather, the data memory may also be arranged locationally separate from the first data processing device and/or the second data processing device.

In addition, the image forming system according to an aspect of the disclosure includes a processor, loaded in which there is a computer program product which has at least one of the features mentioned further above or mentioned further below or a combination of at least two of the features mentioned further above or further below.

In one exemplary embodiment of the image forming system according to an aspect of the disclosure, it is additionally or alternatively provided that the first imaging system is formed as a first optical imaging system. In particular, it is provided that the first optical imaging system has at least one lens element. For example, the first optical imaging system has a first objective lens and a first image capturing unit. The first image capturing unit is formed for example as an electronic image sensor. In particular, the electronic image sensor is formed as a digital image capturing unit, for example in the form of a CMOS. As an alternative, it is provided that the image capturing unit is formed as a light-sensitive chemical film. The first optical imaging system is formed for example as a camera. In particular, it is provided that the camera is formed as a film camera which is used in the area of cinematography. As an alternative, it is provided that the camera is formed as a camera which is used in the area of photography. The first objective lens has at least one lens unit and at least one stop unit, which is provided with an aperture. For example, the first objective lens has at least one lens group, which is moved along an optical axis of the first objective lens for setting the focusing of the first objective lens on the object and/or for setting a focal length of the first objective lens. A lens group is understood hereinbefore and hereinafter as meaning a group which has a single lens element or a plurality of lens elements. In addition, the lens group may also have at least one prism.

In a further exemplary embodiment of the image forming system according to an aspect of the disclosure, it is additionally or alternatively provided that the first imaging system is formed as a computer graphics system with which a three-dimensional scene which has a sequence of a plurality of three-dimensional representations is generated by mathematical calculation of data. As an alternative, with the computer graphics system a three-dimensional representation is generated by mathematical calculation of data. The first data of the first data record then include for example the data generated by this mathematical calculation. In addition or as an alternative, the aforementioned mathematically calculated data are converted into a two-dimensional image sequence and/or into a two-dimensional image. Then, the first data include data of the two-dimensional image sequence and/or of the two-dimensional image.

As mentioned above, the data of a three-dimensional scene or of a three-dimensional representation are mathematically calculated. For this purpose, a computer graphic designer uses for example a mathematical model of a three-dimensional scene and/or of a three-dimensional representation. The mathematical model includes for example parameters which describe in particular the form, the color and the surface finish of an object to be modelled which is to be represented in the three-dimensional scene and/or in the three-dimensional representation. Furthermore, the mathematical model includes for example parameters which describe the illumination of the object, in particular the location, the type, the color and the direction of light sources to be modelled. In addition, the mathematical model includes the position of the object in the three-dimensional scene and/or in the three-dimensional representation at least one of the following: the capturing direction, the field of view, the focal length, the focusing, the image format, the size of the image capturing unit, the position and the path of movement of a virtual camera.

In yet a further exemplary embodiment of the image forming system according to an aspect of the disclosure, it is additionally or alternatively provided that the second imaging system is formed as an optical imaging system. For example, the second optical imaging system has at least one lens element. The second optical imaging system is formed for example as a camera. In particular, it is provided that the camera is formed as a film camera which is used in the area of cinematography. As an alternative, it is provided that the camera is formed as a camera which is used in the area of photography. The second objective lens has at least one lens unit and at least one stop unit, which is provided with an aperture. For example, the second objective lens has at least one lens group, which is moved along an optical axis of the second objective lens for setting the focusing of the second objective lens on the object and/or for setting a focal length of the second objective lens. A lens group is understood hereinbefore and hereinafter as meaning a group which has a single lens element or a plurality of lens elements. In addition, the lens group may also have at least one prism.

In one exemplary embodiment of the image forming system according to an aspect of the disclosure, it is additionally or alternatively provided that the second imaging system is formed as a virtual camera. The at least second imaging parameter has the effect that an image of the object on the basis of the data about the object is represented on the display unit in such a way as though the virtual camera using the second imaging parameter were actually imaging the object. Expressed differently, an image of the object is intended to be formed by mathematical calculation on the basis of the data about the object and represented on the display unit in such a way as though a camera which has the property chosen by the second imaging parameter were actually imaging the object.

As already mentioned above, in one exemplary embodiment of the image forming system according to an aspect of the disclosure it is additionally or alternatively provided that the first imaging system has at least one of the following features: a first camera, a first objective lens, a first stop unit, a first focusing unit and/or a first focal-length setting unit. With regard to the first camera and the first objective lens, reference is made to the comments made further above, which also apply here. The first stop unit is for example a stop with an adjustable aperture. The first focusing unit and the first focal-length setting unit have for example single lens elements or multiple lens elements, which can be combined to form lens groups. Single or multiple lenses are movably designed, so that on the one hand the first imaging system can be focused on an object and on the other hand a focal length of the first imaging system can be set.

As already mentioned above, in a further exemplary embodiment of the image forming system according to an aspect of the disclosure, it is additionally or alternatively provided that the second imaging system has at least one of the following features: a second camera, a second objective lens, a second stop unit, a second focusing unit, and/or a second focal-length setting unit. With regard to the second camera and the second objective lens, reference is made to the comments made further above, which also apply here. The second stop unit is for example a stop with an adjustable aperture. The second focusing unit and the second focal-length setting unit have for example single lens elements or multiple lens elements, which can be combined to form lens groups. Single or multiple lenses are movably designed, so that on the one hand the second imaging system can be focused on an object and on the other hand a focal length of the second imaging system can be set.

As already mentioned above, in one exemplary embodiment of the image forming system according to an aspect of the disclosure it is additionally or alternatively provided that the second imaging system is a virtual camera for forming an image of the object by mathematical calculation on the basis of the data about the object in such a way as though a camera which has the property chosen by the second imaging parameter were actually imaging the object. In addition or as an alternative, it is provided that the second data record is formed as a mathematical imaging rule, in particular as a polynomial or as a Fourier development, the mathematical mapping rule representing the virtual camera and describing in a mathematical form how and where a light beam entering an objective lens of the virtual camera and emerging again from the objective lens is imaged on an image capturing unit of the virtual camera. It is explicitly pointed out that the mathematical mapping rule is not restricted to the aforementioned exemplary embodiments. Rather, any mathematical mapping rule that is suitable for the disclosure can be used.

Further exemplary embodiments and advantages of the disclosure are described below in association with the drawings.

BRIEF DESCRIPTION OF THE DRAWINGS

The disclosure will now be described with reference to the drawings wherein:

FIG. 8 shows a schematic representation of imaging parameters of an imaging system;

FIG. 9 shows a schematic representation of a flow diagram of the method according to a further exemplary embodiment of the disclosure;

DESCRIPTION OF EXEMPLARY EMBODIMENTS

Figure 1:
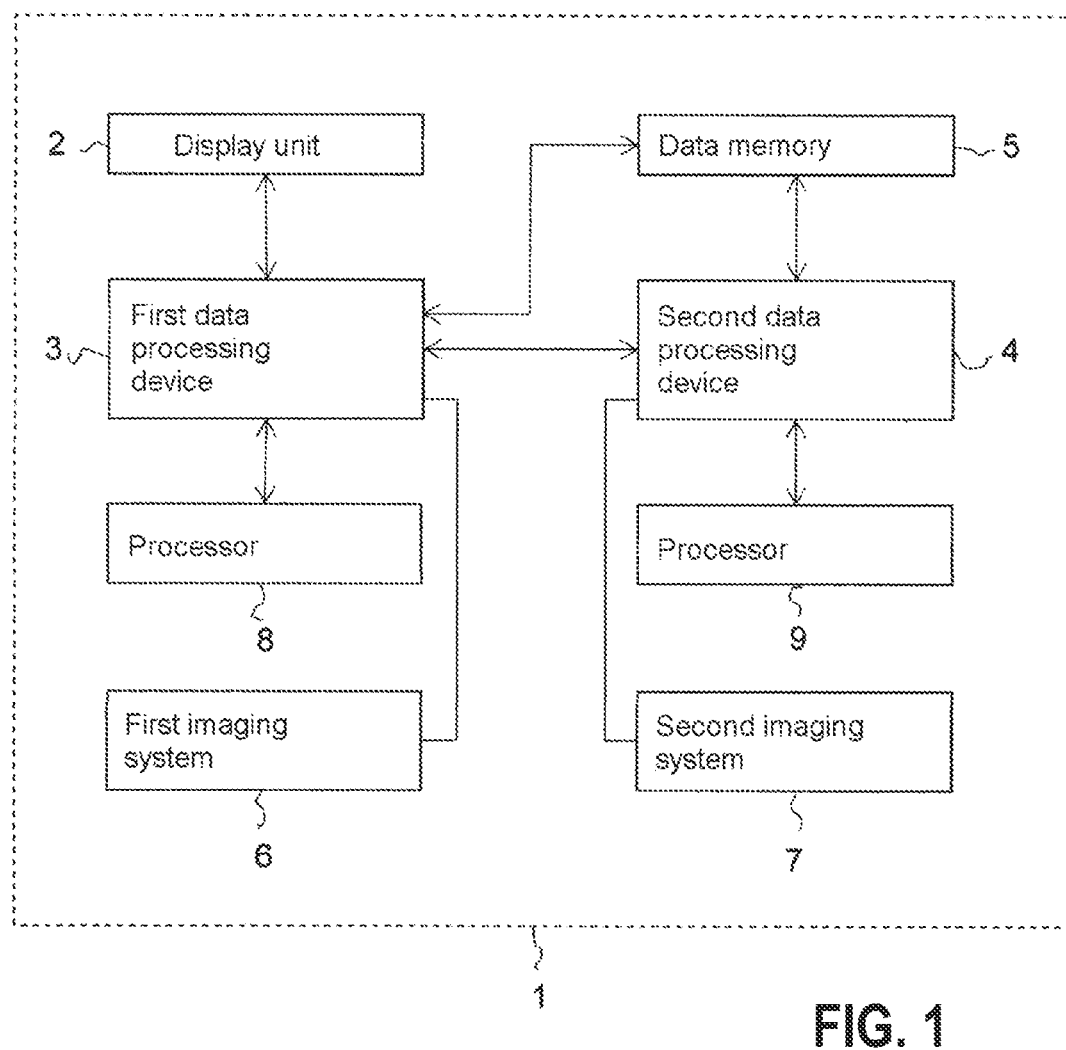
FIG. 1 shows a schematic representation of an image forming system according to an exemplary embodiment of the disclosure.

FIG. 1 shows a schematic representation of an image forming system 1 according to an aspect of the disclosure, which serves for forming an image of an object. The image forming system 1 has a display unit 2, which is formed for example as a monitor. However, the disclosure is not restricted to such a display unit 2. Rather, any display unit 2 that is suitable for the disclosure can be used for the disclosure.

In addition, the image forming system 1 has a first data processing device 3. The first data processing device 3 is for example an electronic system which is formed by a central unit and peripheral devices. For example, the central unit is a local computer, a server unit, a network with a plurality of workstations, a cloud-based virtual server, a tablet computer and/or a smartphone. The peripheral devices are formed for example as an input and/or output unit, in particular in the form of a keyboard, and/or as a monitor.

The image forming system 1 also has a second data processing device 4, which is connected to the first data processing device 3 for data exchange. In particular, it is envisaged to connect the first data processing device 3 to the second data processing device 4 by lines. In addition or as an alternative, it is envisaged to connect the first data processing device 3 to the second data processing device 4 wirelessly in such a way that a data exchange can take place. For example, the wireless connection between the first data processing device 3 and the second data processing device 4 is a radio connection or a WLAN connection. In addition or as an alternative, the first data processing device 3 may be connected to the second data processing device 4 by way of the Internet.

The second data processing device 4 is for example an electronic system which has a central unit. For example, the central unit is a local computer, a server unit, a network with a plurality of workstations, a cloud-based virtual server, a tablet computer and/or a smartphone. In addition, the second data processing device 4 may for example be provided with peripheral devices. The peripheral devices are formed in particular as an input and/or output unit, for example in the form of a keyboard, and/or as a monitor.

The image forming system 1 additionally has a data memory 5. The data memory 5 is for example assigned to the first data processing device 3 and/or the second data processing device 4. For example, it is provided that the data memory 5 is a unit of the first data processing device 3 and/or of the second data processing device 4. The location of the data memory 5 does not have to be identical to the location of the first data processing device 3 and/or the second data processing device 4. Rather, the data memory 5 may also be arranged locationally separate from the first data processing device 3 and/or the second data processing device 4.

The image forming system 1 also has a first imaging system 6. For example, the first imaging system 6 is formed as a first optical imaging system. The first imaging system 6 in the form of the first optical imaging system has at least one lens element. For example, the first imaging system 6 in the form of the first optical imaging system has a first objective lens and a first image capturing unit. The first image capturing unit is formed for example as an electronic image sensor. In particular, the electronic image sensor is formed as a digital image capturing unit, for example in the form of a CMOS. As an alternative, it is provided that the image capturing unit is formed as a light-sensitive chemical film. The first imaging system 6 in the form of the first optical imaging system is formed for example as a camera. In particular, it is provided that the camera is formed as a film camera which is used in the area of cinematography. As an alternative, it is provided that the camera is formed as a camera which is used in the area of photography. The first objective lens has at least one lens unit and at least one stop unit, which is provided with an aperture. For example, the first objective lens has at least one lens group, which is moved along an optical axis of the first objective lens for setting the focusing of the first objective lens on the object and/or for setting a focal length of the first objective lens. A lens group is understood hereinbefore and hereinafter as meaning a group which has a single lens element or a plurality of lens elements. In addition, the lens group may also have at least one prism.

Figure 2:
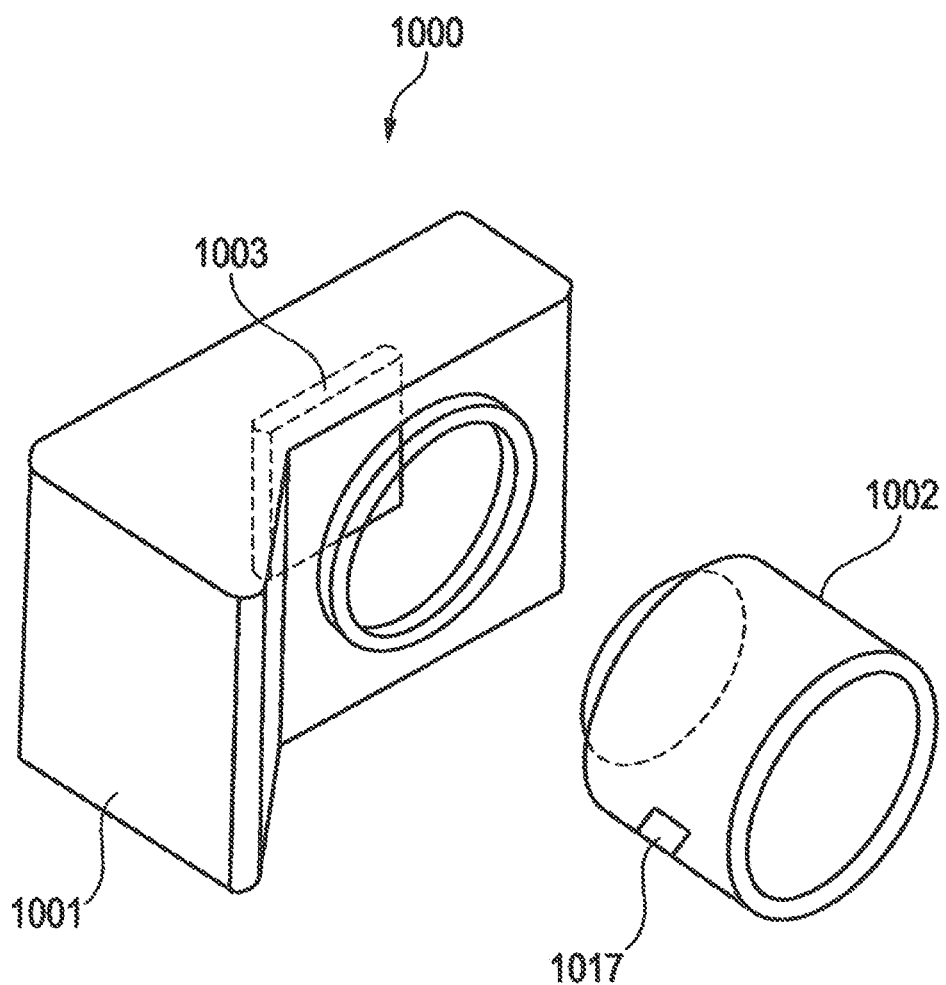
FIG. 2 shows a schematic representation of an imaging system in the form of a camera.
Figure 3:
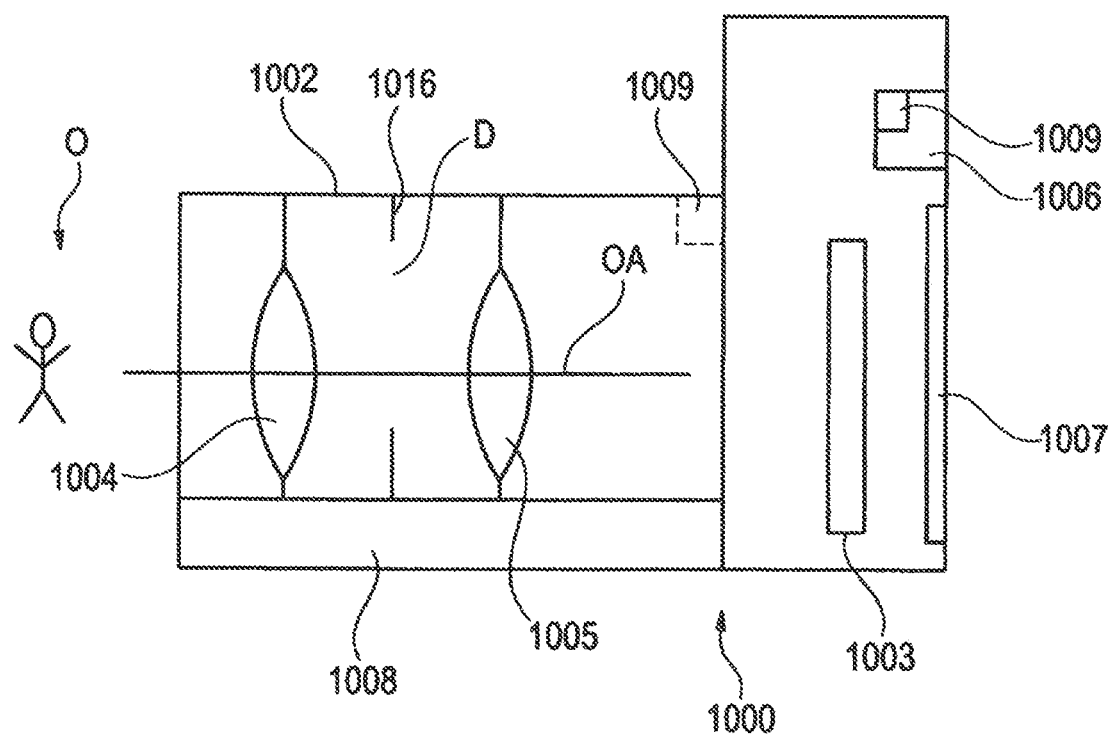
FIG. 3 shows a further schematic representation of the imaging system according to FIG. 2.

FIGS. 2 and 3 show an exemplary embodiment of the first imaging system 6 in the form of a camera 1000. FIG. 2 shows a schematic representation of a camera 1000. The camera 1000 is formed for example as a photographic camera or as a film camera. The camera 1000 has a housing 1001, on which an objective lens 1002 is arranged. An image capturing unit 1003, which captures images that are imaged by the objective lens 1002, is arranged in the housing 1001. For example, the image capturing unit 1003 is a digital image capturing unit, in particular a CMOS sensor. However, the disclosure is not restricted to the use of a digital image capturing unit. Rather, any image capturing unit that is suitable for the disclosure, for example a photographic film, may be used for the image capturing unit. In the exemplary embodiment shown in FIG. 2, the objective lens 1002 is formed as an interchangeable objective lens. However, the disclosure is not restricted to such an objective lens. Rather, an objective lens that is not detachably arranged on the housing 1001 of the camera 1000 is also suitable for the disclosure. For example, an XD data interface 1017 is arranged on the objective lens 1002 for the connection of a data memory unit.

FIG. 3 shows a further schematic representation of the camera 1000 according to FIG. 2 in a vertical section. In this exemplary embodiment, the objective lens 1002 has a first lens unit 1004 and a second lens unit 1005, which are arranged one behind the other along an optical axis OA of the objective lens 1002. The objective lens 1002 can have a certain number of individual lens elements, lens groups and/or further optical units, for example in the form of prisms or mirrors. The disclosure is not restricted to a certain embodiment of an objective lens. Rather, any suitable objective lens can be used in the disclosure. A stop unit 1016, which has an adjustable aperture with a diameter D, is arranged between the first lens unit 1004 and the second lens unit 1005. The camera 1000 also has a processor 1006 and a monitor 1007. The image capturing unit 1003 is also provided on the camera 1000. From the object O to be imaged in the direction of the image capturing unit 1003, first the object O, then the objective lens 1002 and then the image capturing unit 1003 are arranged. In addition, the camera 1000 and/or the objective lens 1002 has a simultaneous localization and mapping (SLAM) module 1008, the construction, function and operating mode of which are explained in more detail below.

The SLAM module 1008 has an inertial measuring unit, a depth camera and an environment camera. The inertial measuring unit of the SLAM module 1008 has acceleration sensors and rate-of-rotation sensors, which for example make it possible to detect a movement of the camera 1000 or of the objective lens 1002 with 6 degrees of freedom. The inertial measuring unit is essentially an inertial navigation system and serves for detecting the movement and for establishing the location of the camera 1000 or the objective lens 1002 in space. The depth camera of the SLAM module 1008 serves for determining the distance of the objective lens 1002 from a point in space, that is to say a point in the environment of the camera 1000. For example, the depth camera is formed as a plenoptic imaging unit, as a stereoscopic imaging unit, as a time-of-flight imaging unit (that is to say as a TOF imaging unit) and/or as a unit for the projection and capture of a pattern (for example structured light projection or projection of a point cloud). A plenoptic imaging unit, for example a plenoptic camera, is known from the prior art. With a plenoptic camera, it is not only possible to determine the position and the intensity of a light beam on the image capturing unit 1003 but also possible to determine the direction from which the light beam is incident. A stereoscopic imaging unit, for example in the form of a stereoscopic camera, is also known from the prior art. This is based on the principle of stereoscopy. Further, a TOF imaging unit, for example in the form of a TOF camera, is also known from the prior art. In the case of a TOF camera, the distance between the object O and the TOF camera is measured by a time-of-flight method. However, it is pointed out that the disclosure is not restricted to the use of the aforementioned imaging units for determining the distances. Rather, any suitable method and/or any suitable imaging unit can be used for determining the distances. For example, the distances may also be determined with an ultrasonic measurement unit by using an ultrasonic measurement method. The environment camera of the SLAM module 1008 serves for capturing the environment of the camera 1000.

The camera 1000 is also provided with a communications device 1009. As an alternative, the objective lens 1002 is provided with the communications device 1009, which is illustrated by the dashed lines in FIG. 3. The communications device 1009 is formed as a radio device, which uses a transmission standard or a plurality of transmission standards on a transmission path or a plurality of transmission paths. For example, Bluetooth is used as a transmission standard. A wireless local area network, i.e., a WLAN, is also used for transmission. As already explained above, the disclosure is not restricted to such a form of the communications device. Rather, the communications device 1009 may have any form that is suitable for the disclosure.

In a further exemplary embodiment of the image forming system 1, it is additionally or alternatively provided that the first imaging system 6 is formed as a computer graphics system with which a three-dimensional scene which has a sequence of a plurality of three-dimensional representations is generated by mathematical calculation of data. As an alternative, with the computer graphics system a three-dimensional representation is generated by mathematical calculation of data. For the calculation, a computer graphic designer uses for example a mathematical model of a three-dimensional scene and/or of a three-dimensional representation. The mathematical model includes for example parameters which describe in particular the form, the color and the surface finish of an object to be modelled which is to be represented in the three-dimensional scene and/or in the three-dimensional representation. Furthermore, the mathematical model includes for example parameters which describe the illumination of the object, in particular the location, the type, the color and the direction of light sources to be modelled. In addition, the mathematical model includes the position of the object in the three-dimensional scene and/or in the three-dimensional representation at least one of the following: the capturing direction, the field of view, the focal length, the focusing, the image format, the size of the image capturing unit, the position and the path of movement of a virtual camera.

The image forming system 1 also has a second imaging system 7. For example, the second imaging system 7 is formed as a second optical imaging system. The second imaging system 7 in the form of the second optical imaging system has at least one lens element. The second imaging system 7 in the form of the second optical imaging system is formed for example as a camera with a second objective lens. In particular, it is provided that the camera is formed as a film camera which is used in the area of cinematography. As an alternative, it is provided that the camera is formed as a camera which is used in the area of photography. The second objective lens has at least one lens unit and at least one stop unit, which is provided with an aperture. For example, the second objective lens has at least one lens group, which is moved along an optical axis of the second objective lens for setting the focusing of the second objective lens on the object and/or for setting a focal length of the second objective lens. A lens group is understood hereinbefore and hereinafter as meaning a group which has a single lens element or a plurality of lens elements. In addition, the lens group may also have at least one prism.

The second imaging system 7 may for example likewise be formed as represented in FIGS. 2 and 3. Reference is made to the comments made above, which also apply here.

In one exemplary embodiment of the image forming system 1, it is additionally or alternatively provided that the second imaging system 7 is formed as a virtual camera. With a virtual camera, an image of the object is formed by mathematical calculation and is represented on the display unit 2 in such a way as though a camera which has the same properties as the virtual camera actually images the object.

The image forming system 1 has a first processor 8 and a second processor 9. The first processor 8 is assigned to the first data processing device 3. Expressed differently, the first processor 8 is connected to the first data processing device 3. For example, it is provided that the first processor 8 is a unit of the first data processing device 3. The second processor 9 is assigned to the second data processing device 4. Expressed differently, the second processor 9 is connected to the second data processing device 4. For example, it is provided that the second processor 9 is a unit of the second data processing device 4.

The first processor 8 and the second processor 9 have a computer program product with a program code which has been partially or completely loaded into the first processor 8 and/or into the second processor 9. During execution of the program code, the image forming system 1 is controlled in such a way that a method according to the disclosure is carried out. Exemplary embodiments of the method according to an aspect of the disclosure are explained in more detail below.

Figure 4:
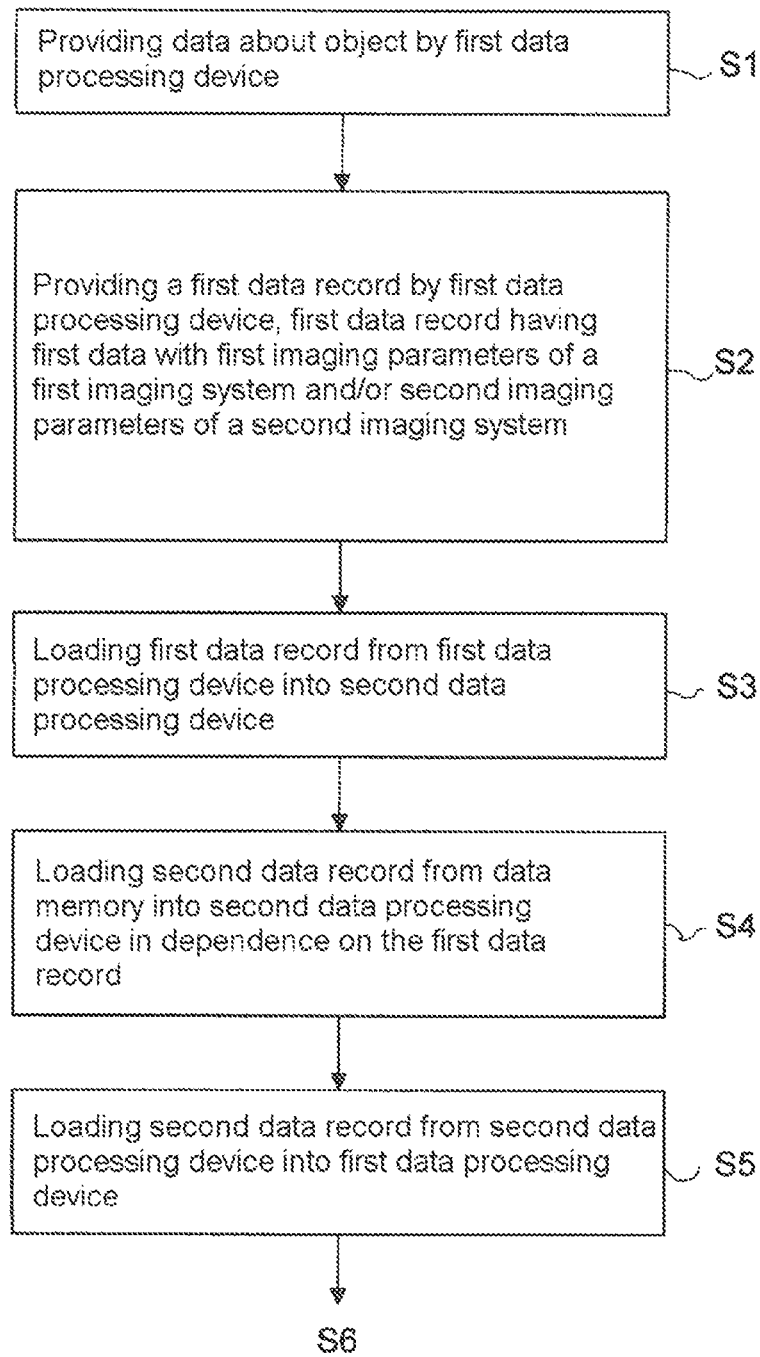
FIG. 4 shows a schematic representation of a flow diagram of a method according to an exemplary embodiment of the disclosure.
Figure 5:
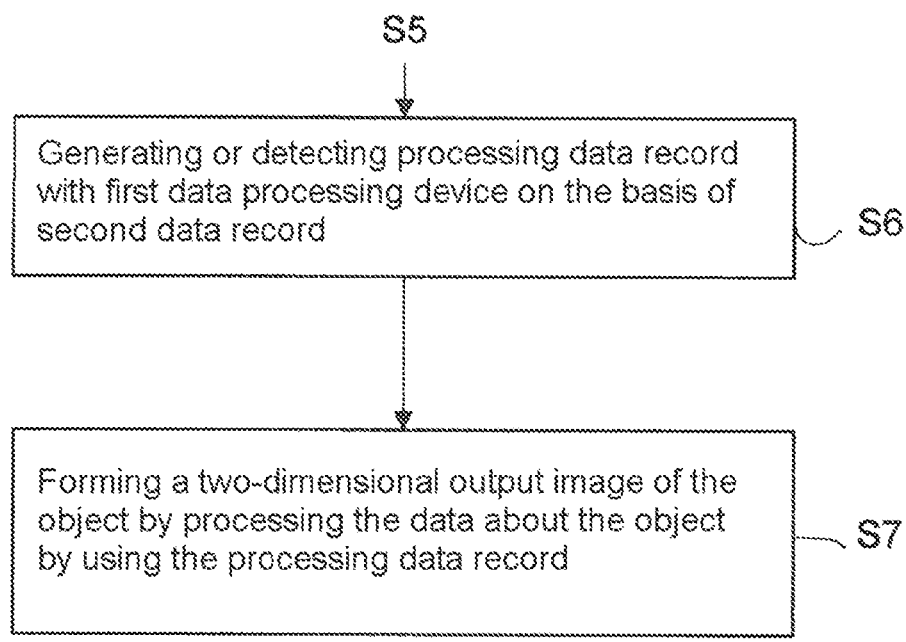
FIG. 5 shows a schematic representation of further method steps of the method according to FIG. 4 according to en exemplary embodiment of the disclosure.

FIGS. 4 and 5 show a flow diagram of an exemplary embodiment of the method according to an aspect of the disclosure. In method step S1, data about the object are provided by the first data processing device 3. As already mentioned further above, data about the object are those data that describe the object. For example, the data about the object are at least one two-dimensional input image of the object. In addition or as an alternative, the data about the object are for example at least one three-dimensional representation of the object. Again, in addition or as an alternative, it is provided that the data about the object are data with which a multidimensional, for example a two-dimensional or three-dimensional, representation of the object can be calculated. The aforementioned enumeration of data about the object should not be understood as exhaustive. Rather, any data about the object that describe the object and are suitable for carrying out the disclosure may be used.

Figure 6:
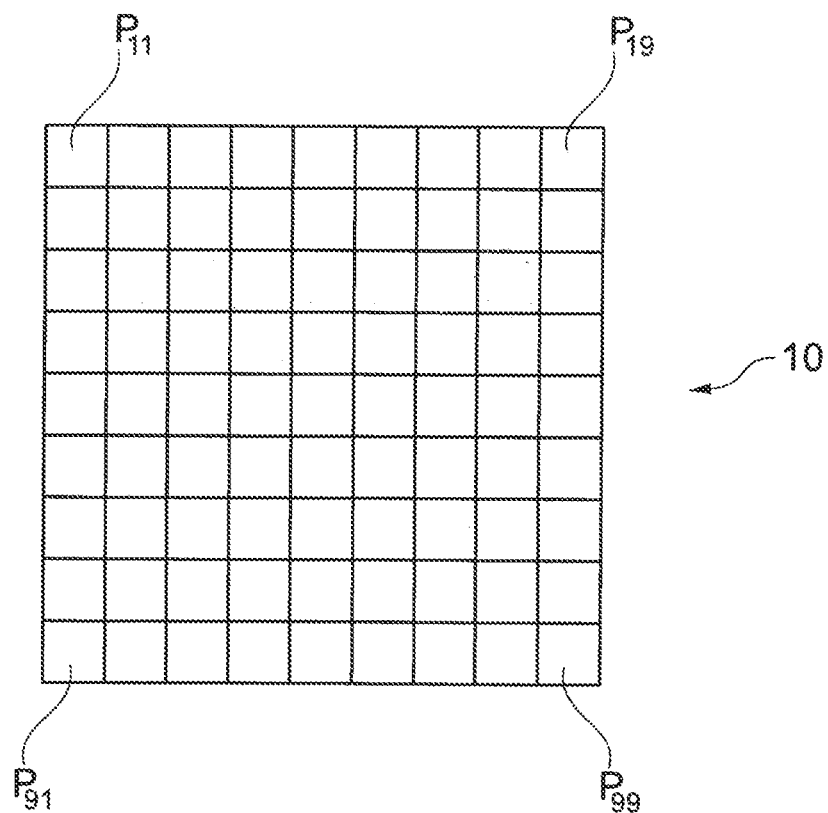
FIG. 6 shows a schematic representation of a two-dimensional input image.

As already mentioned above, the data about the object include for example at least one two-dimensional input image of the object. FIG. 6 shows a schematic representation of an exemplary embodiment of the two-dimensional input image 10, which has a predetermined number of input image pixels $P_{op}$, o and p being whole numbers, for which the following applies: $1 \leq o \leq n$ and $1 \leq p \leq n$. Here, n corresponds to the total number of input image pixels. For the exemplary embodiment shown in FIG. 6, the following applies: $n=81$. By way of example, four of the input image pixels are denoted by reference signs, to be specific by $P_{11}$, $P_{19}$, $P_{91}$, and $P_{99}$. It is explicitly pointed out that the total number of input image pixels is not restricted to the aforementioned value. Rather, the total number of input image pixels can assume any value that is suitable. In particular, the total number of input image pixels lies well within the 6-digit, well within the 7-digit, well within the 8-digit or well within the 9-digit range.

The two-dimensional input image 10 is for example formed with the first imaging system 6. For example, the two-dimensional input image 10 is formed with the camera 1000, which is represented in FIGS. 2 and 3. To this extent, the two-dimensional input image 10 according to the definition explained further above is an actually formed image. In particular, it is envisaged to store the two-dimensional input image 10 on a data carrier (not represented), from which the first data processing device 3 loads and provides the input image 10.

Figure 7:
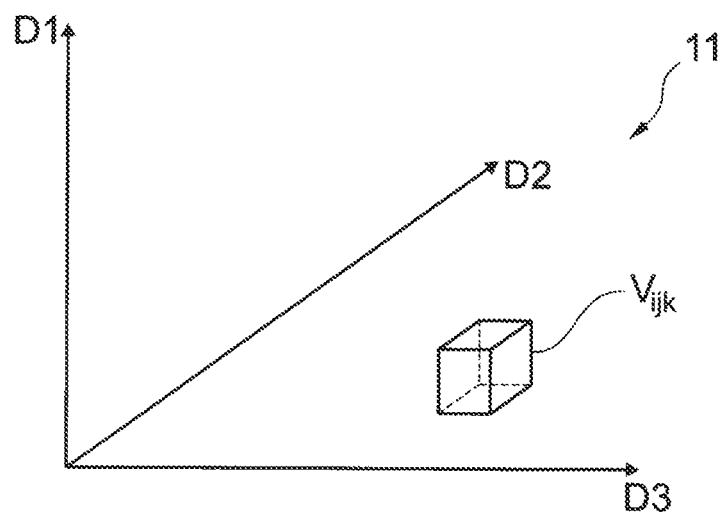
FIG. 7 shows a three-dimensional representation of data.

As likewise already discussed above, the data about the object include for example at least one three-dimensional representation. FIG. 7 shows a schematic representation of an exemplary embodiment of the three-dimensional representation 11. This includes first data contents in a first dimension D1, second data contents in a second dimension D2, and third data contents in a third dimension D3. The first data contents, the second data contents, and the third data contents may for example be represented as a voxel $V_{ijk}$, where i, j, and k are whole numbers for which the following applies for example: $1 \leq I \leq m$, $1 \leq j \leq m$, and $1 \leq k \leq m$. Here, m corresponds to the total number of voxels. The total number of voxels can assume any value that is suitable. In particular, the total number of voxels lies well within the 6-digit, well within the 7-digit, well within the 8-digit or well within the 9-digit range. The disclosure is not restricted to the previously described exemplary embodiment of the data about the object with regard to the three-dimensional representation. Rather, any embodiment that is suitable for the disclosure can be used. Reference is made to the comments further above, which also apply here.

As already mentioned above, a three-dimensional scene, which has a sequence of a plurality of three-dimensional representations, and/or a three-dimensional representation may be generated by mathematical calculation of data. For this purpose, a mathematical model of the three-dimensional scene and/or of the three-dimensional representation is used. The mathematical model includes for example parameters which describe in particular the form, the color and the surface finish of an object to be modelled which is to be represented in the three-dimensional scene and/or in the three-dimensional representation. Furthermore, the mathematical model includes for example parameters which describe the illumination of the object, in particular the location, the type, the color and the direction of light sources to be modelled. In addition, the mathematical model includes the position of the object in the three-dimensional scene and/or in the three-dimensional representation at least one of the following: the capturing direction, the field of view, the focal length, the focusing, the image format, the size of the image capturing unit, the position and the path of movement of a virtual camera. The data calculated with the mathematical model are for example the data about the object.

In method step S2, the first data processing device 3 is used for providing a first data record. In one exemplary embodiment of the method according to an aspect of the disclosure, the first data record comprises the following first data:

user identification data, with which it is possible to clearly identify a user of the method according to an exemplary embodiment of the disclosure. For example, the user identification data comprise an authorization of use for carrying out the method according to an exemplary embodiment of the disclosure or parts of the method according to an exemplary embodiment of the disclosure. The authorization of use may exist for example whenever the user has paid to carry out the method according to an exemplary embodiment of the disclosure, will pay in the near future, has been provided with a line of credit to carry out the method according to an exemplary embodiment of the disclosure or has acquired a license for carrying out the method according to an exemplary embodiment of the disclosure, identification data, with which a clear identification of the data about the object is made possible. In this way it is possible for example to clearly identify the two-dimensional input image 10 and/or data about the object that concern the three-dimensional representation 11, and at least a first imaging parameter of the first imaging system 6 with which the data about the object have been generated, and/or at least a second imaging parameter of the second imaging system 7 with the properties of which an image of the object is intended to be represented on the display unit 2 on the basis of the data about the object.

Consequently, the first data may include at least the first imaging parameter of the first imaging system 6 with which the data about the object have been generated. Examples of the first imaging parameter are represented in FIG. 8. For example, first meta data 12A of the first imaging system 6 are used as the first imaging parameter. The first meta data 12A include for example imaging properties and/or functional units of the first imaging system 6. These are in particular read out by the first data processing device 3 from the data of the object or are manually input into the first data processing device 3. For example, the first meta data 12A include at least one of the following parameters:

first camera data 13A about the camera 1000 with which the data about the object have been generated, first objective lens data 14A about the objective lens 1002 with which the data about the object have been generated, first stop unit data 15A about the stop unit 1016 with which the data about the object have been generated, first focusing unit data 16A about the first focusing unit in the form of the first lens unit 1004 and the second lens unit 1005 with which the data about the object have been generated, first focal-length setting unit data 17A about a first focal length setting unit in the form of the first lens unit 1004 and the second lens unit 1005 with which the data about the object have been generated, and first information 18A about a position and a location of the first imaging system 6 in the form of the camera 1000 in space. Expressed differently, first information 18A about the position and the alignment of the first imaging system 6 for example in three-dimensional space is provided, and first information 19A about a resolution of the first imaging system 6. Expressed differently, the resolution with which the data about the object have been generated is provided. For example, the resolution is a so-called "full HD" resolution, that is to say in particular a resolution of 1920×1080 pixels. In addition or as an alternative, the resolution is a so-called 2 k resolution, that is to say in particular a resolution of 2560× 1440 pixels. However, the disclosure is not restricted to the aforementioned resolutions. Rather, any resolution that is suitable for the disclosure can be used. In addition or as an alternative, a user may input a desired target resolution.

As explained above, the first imaging system 6 may also be formed as a computer graphics system with which a three-dimensional scene which has a sequence of a plurality of three-dimensional representations is generated by mathematical calculation of data. As an alternative, with the computer graphics system, a three-dimensional representation is generated by mathematical calculation of data. The first data of the first data record then include for example the data generated by this mathematical calculation. In addition or as an alternative, the aforementioned mathematically calculated data are converted into a two-dimensional image sequence and/or into a two-dimensional image. Then, the first data include data of the two-dimensional image sequence and/or of the two-dimensional image.

As explained above, the first data may additionally or alternatively include at least the second imaging parameter of the second imaging system 7. With the properties of the second imaging system 7, an image of the object is intended to be represented on the display unit 2 on the basis of the data about the object. For an exemplary embodiment in which the second imaging system 7 is formed as the second optical imaging system, examples of the second imaging parameter are represented in FIG. 8. For example, second meta data 12B of the second imaging system 7 are used as the second imaging parameter. The second meta data 12B include for example imaging properties and/or functional units of the second imaging system 7. These are in particular read out by the first data processing device 3 from the data of the object or are manually input into the first data processing device 3. For example, the second meta data 12B include at least one of the following parameters:

second camera data 13B about the camera 1000 with the properties of which the data about the object are intended to be represented on the display unit 2, second objective lens data 14B about the objective lens 1002 with the properties of which the data about the object are intended to be represented on the display unit 2, second stop unit data 15B about the stop unit 1016 with the properties of which the data about the object are intended to be represented on the display unit 2, second focusing unit data 16B about the second focusing unit in the form of the first lens unit 1004 and the second lens unit 1005 with the properties of which the data about the object are intended to be represented on the display unit 2, second focal-length setting unit data 17B about a second focal-length setting unit in the form of the first lens unit 1004 and the second lens unit 1005 with the properties of which the data about the object are intended to be represented on the display unit 2, and second information 18B about a position and a location of the second imaging system 7 in the form of the camera 1000 in space. Expressed differently, second information 18B about the position and the alignment of the second imaging system 7 for example in three-dimensional space is provided, and second information 19B about a resolution of the second imaging system 7. Expressed differently, the resolution with which the data about the object have been generated is provided. For example, the resolution is a so-called "full HD" resolution, that is to say in particular a resolution of 1920×1080 pixels. In addition or as an alternative, the resolution is a so-called 2 k resolution, that is to say in particular a resolution of 2560× 1440 pixels. However, the disclosure is not restricted to the aforementioned resolutions. Rather, any resolution that is suitable for the disclosure can be used. In addition or as an alternative, a user may predetermine a desired target resolution.

In addition or as an alternative, it is provided that the second imaging system 7 is formed as a virtual camera. The at least second imaging parameter has the effect that an image of the object on the basis of the data about the object is represented on the display unit 2 in such a way as though the virtual camera using the second imaging parameter were actually imaging the object. Expressed differently, an image of the object is intended to be formed by mathematical calculation on the basis of the data about the object and represented on the display unit 2 in such a way as though a camera which has the property chosen by the second imaging parameter were actually imaging the object.

In method step S3, loading of the first data record from the first data processing device 3 into the second data processing device 4 takes place. Then, in method step S4, loading of a second data record takes place from the data memory 5 into the second data processing device 4 in dependence on the first data record loaded into the second data processing device 4. Expressed differently, the second data record is selected in dependence on the first data record loaded into the second data processing device 4 and is then loaded from the data memory 5 into the second data processing device 4. If the first data record concerns the first imaging parameter of the first imaging system 6, then the second data record has second data, which include modification data for modifying imaging errors in dependence on the first imaging parameter of the first imaging system 6. For example, the modification data are data for correcting imaging errors in dependence on the first imaging parameter of the first imaging system 6. If the first data record additionally or alternatively concerns the second imaging parameter of the second imaging system 7, then the second data record has second data, which comprise modification data for modifying the data about the object in dependence on the second imaging parameter of the second imaging system 7.

Consequently, the second data may include modification data for modifying imaging errors in dependence on the first imaging parameter of the first imaging system 6. In particular, the modification data are data for correcting imaging errors in dependence on the first imaging parameter of the first imaging system 6. Expressed differently, the second data include correction data which can be used to reduce or completely correct imaging errors which have occurred when generating the data about the object (in particular when forming the aforementioned two-dimensional input image 10 of the object). For example, the correction data are data for correcting a distortion of the first imaging system 6. In addition or as an alternative, it is provided that data for correcting vignetting of the first imaging system 6 are used as correction data.

In addition or as an alternative, the second data include modification data for modifying the data about the object in dependence on the second imaging parameter of the second imaging system 7. Expressed differently, with the aid of the modification data the data about the object can be modified in dependence on the second imaging parameter of the second imaging system 7. The modification of the data about the object takes place for example in such a way that the modification of the data about the object has the effect of forming an image of the object which essentially corresponds or substantially corresponds to an image of the object formed with the aforementioned second optical imaging system 7 or an image of the object formed with the aforementioned virtual camera.

The second data record may be designed for example in the form of a polynomial. The polynomial represents for example a virtual camera and describes in a mathematical form how and where a light beam entering an objective lens of the virtual camera and emerging again from the objective lens is imaged on the image capturing unit of the virtual camera. For example, the polynomial has the following form:

$$x_f = \sum_{i,j,k,l,m} c_{ijklm} x_S^i y_S^j x_a^k y_a^l \beta^m$$

where $x_s$ and $y_s$ represent the beam position of the emerging light beam on a surface of the image capturing unit, $x_a$ and $y_a$ represent a beam position of the incident light beam on a plane of a virtual stop and $\beta$ is a desired imaging scale.

In method step S5, loading of the second data record from the second data processing device 4 into the first data processing device 3 takes place. In this case, the identification data about the data of the object can be loaded together with the second data record from the second data processing device 4 into the first data processing device 3. In addition or as an alternative, it is provided that information about the costs for carrying out the method are loaded together with the second data record from the second data processing device 4 into the first data processing device 3.

If the user is in agreement with the costs, method step S6 is carried out. Should the user not be in agreement with the costs, the second data are erased from the first data processing device 3 and the method is stopped. As an alternative, it is envisaged to notify the user of the costs for continuing to carry out the method and then to carry out method step S6. In method step S6, a processing data record is then generated with the first data processing device 3 on the basis of the second data record. For example, the processing data record includes a correction map. As an alternative, it is provided that it is detected with the first data processing device 3 that the second data record is used unchanged as the processing data record.

In method step S7, a two-dimensional output image of the object is formed with the first data processing device 3 by processing the data about the object by using the processing data record, the output image having a predeterminable number of output image pixels. For example, the correction map formed as the processing data record is placed over the two-dimensional input image 10 of the object and corrections of the imaging errors are performed. The two-dimensional output image formed is then the two-dimensional input image 10 of the object provided with the corrections. If, for example, the processing data record is formed as the second data record, in particular in the form of a polynomial, then the data about the object are processed with the processing data record in such a way that an image of the object which essentially corresponds or substantially corresponds to an image of the object formed with the aforementioned second optical imaging system 7 or an image of the object formed with the aforementioned virtual camera is formed as the two-dimensional output image. The two-dimensional output image of the object can then be displayed on the display unit 2.

As already mentioned above, in the exemplary embodiment of the method according to an aspect of the disclosure it is provided that the first data record loaded into the second data processing device 4 has identification data of the data about the object and/or user identification data. In a further exemplary embodiment of the method according to an aspect of the disclosure, it is provided that, before carrying out method step S4, in which the second data record is loaded from the data memory 5, first a check is carried out as to whether an authorization of use exists at all for using the second data record. This exemplary embodiment of the method according to an aspect of the disclosure is shown in FIG. 9. Thus, in method step S3A it is checked on the basis of the identification data and/or the user identification data by using the first data processing device 3 and/or the second data processing device 4 whether an authorization of use exists for using the second data record with the first data processing device 3 and/or the second data processing device 4. The authorization of use may exist for example whenever the user has paid to carry out the method according to the disclosure, will pay in the near future, has been provided with a line of credit to carry out the method according to an exemplary embodiment of the disclosure or has acquired a license for carrying out the method according to an exemplary embodiment of the disclosure. If an authorization of use exists, according to method step S3B method step S4 is carried out. If no authorization of use exists, the user is notified of this. In this case, the user can obtain an authorization of use, for example by paying a usage fee for carrying out the method according to an exemplary embodiment of the disclosure or by acquiring a license. If the user has not obtained an authorization of use, according to method step S3B the method according to an exemplary embodiment of the disclosure is stopped. In addition or as an alternative, it is envisaged to erase the second data record.

Figure 10:
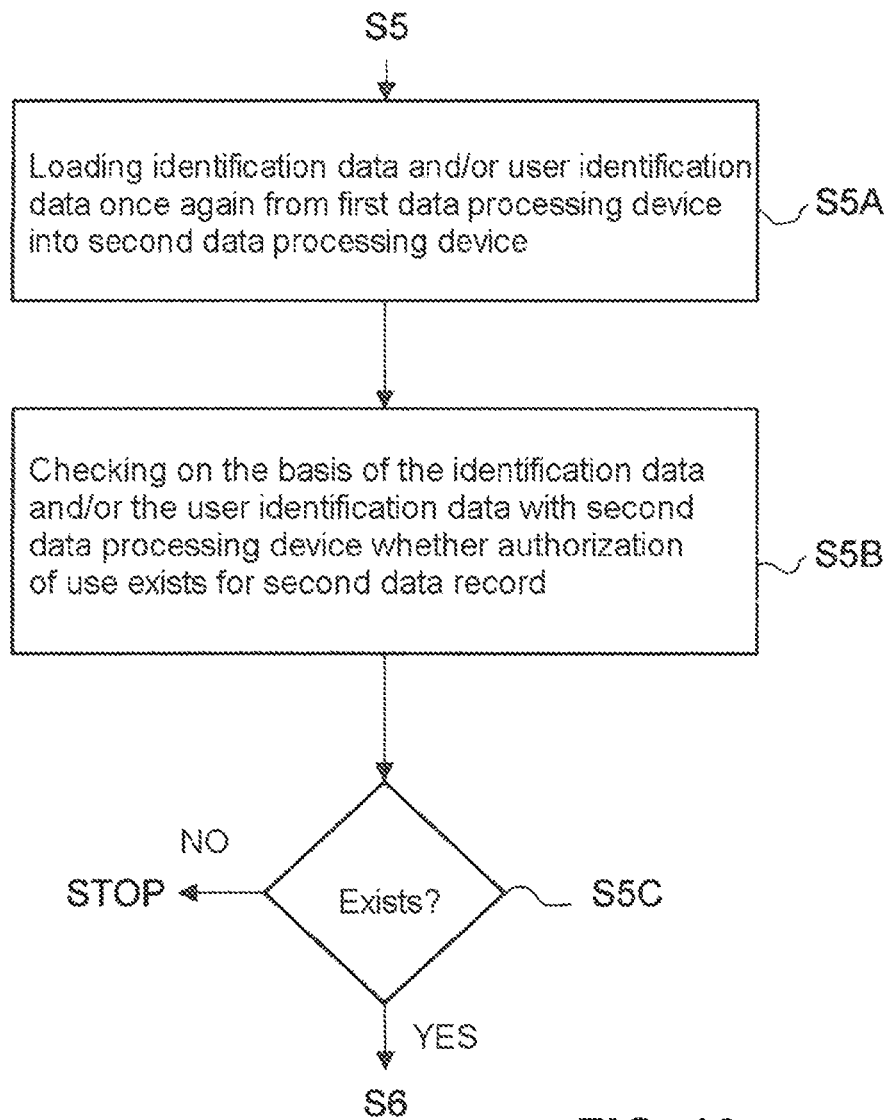
FIG. 10 shows a schematic representation of a flow diagram of the method according to yet a further exemplary embodiment of the disclosure.

In yet a further exemplary embodiment of the method according to an aspect of the disclosure it is additionally or alternatively provided that, before carrying out method step S6, in which the processing data record is generated or is detected, first a check is carried out as to whether an authorization of use exists at all for the use of the second data record. This exemplary embodiment of the method according to an aspect of the disclosure is shown in FIG. 10. Thus, after method step S5, first method step S5A is carried out. In this case, the identification data and/or the user identification data are once again loaded from the first data processing device 3 into the second data processing device 4. In method step S5B, it is checked on the basis of the identification data and/or the user identification data by using the second data processing device 4 whether an authorization of use exists for using the second data record with the first data processing device 3 and/or the second data processing device 4. The authorization of use may exist for example whenever the user has paid to carry out the method according to an exemplary embodiment of the disclosure, will pay in the near future, has been provided with a line of credit to carry out the method according to an exemplary embodiment of the disclosure or has acquired a license for carrying out the method according to an exemplary embodiment of the disclosure. If an authorization of use exists, according to method step S5C method step S6 is carried out. The processing data record is only generated or detected if the authorization of use exists. If no authorization of use exists, the user is notified of this. In this case, the user can obtain an authorization of use, for example by paying a usage fee for carrying out the method according to an exemplary embodiment of the disclosure or by acquiring a license. If the user does not obtain an authorization of use, the method according to an exemplary embodiment of the disclosure is stopped according to method step S5C. In addition or as an alternative, it is envisaged to erase the second data record.

Figure 11:
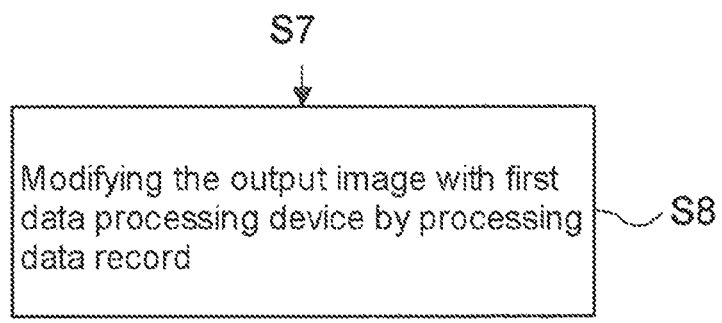
FIG. 11 shows a schematic representation of a flow diagram of the method according to yet a further exemplary embodiment of the disclosure.

In one exemplary embodiment of the method according to an aspect of the disclosure, it is additionally or alternatively provided that, after carrying out method step S7, a further method step S8 is carried out. Method step S8 is represented in FIG. 11. In this exemplary embodiment of the method according to an aspect of the disclosure, it is provided that, after the forming of the two-dimensional output image of the object, the two-dimensional output image is modified once again. It is provided for this purpose that the second data of the second data record include modification data for modifying the formed output image of the object for incorporating imaging errors in the output image of the object in dependence on the first imaging parameter of the first imaging system 6. Furthermore, after being formed or detected, the processing data record has processing data on the basis of the modification data. In method step S8, the output image of the object is modified by processing at least one output image pixel of the predeterminable number of output image pixels of the output image of the object with the first data processing device 3 by using the processing data, pixel values of the output image pixel of the output image of the object being modified with the processing data. In this exemplary embodiment, it is of advantage that an output image which has for example previously been completely or virtually completely corrected and is free from imaging errors is processed by incorporating imaging errors in such a way that an almost natural aesthetic impression is produced, as in the case of an actual image which has been generated with an optical imaging system.

Figure 12:
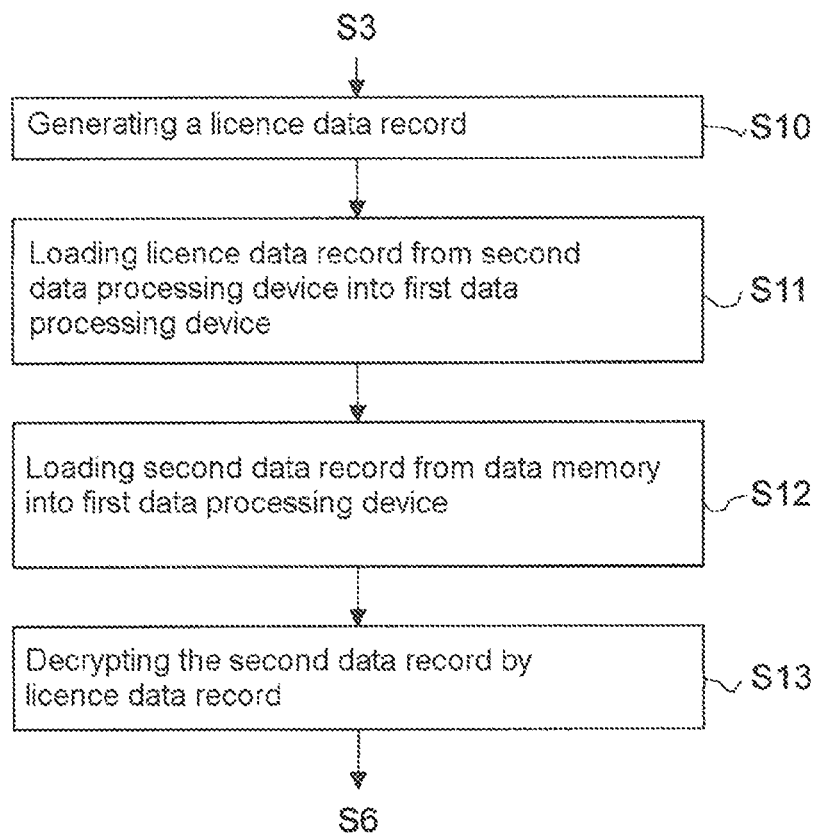
FIG. 12 shows a schematic representation of a flow diagram of the method according to an exemplary embodiment of the disclosure.

FIG. 12 shows a schematic representation of a further exemplary embodiment of the method according to an aspect of the disclosure. The further exemplary embodiment of the method according to an aspect of the disclosure is based on the exemplary embodiment according to FIGS. 4 and 5. Therefore, reference is first made to the statements made further above, which also apply here. The further exemplary embodiment according to FIG. 12 likewise has method steps S1 to S3. After method step S3, method step S10 is carried out. In method step S10, the second data processing device 4 is used for generating a license data record in dependence on the first data record loaded into the second data processing device 4. The license data record is essentially an electronic key with which a suitable second data record can be decrypted (that is to say opened) in order to process the data about the object.

In method step S11, loading of the license data record from the second data processing device 4 into the first data processing device 3 takes place. In this case, the identification data about the data of the object can be loaded together with the license data record from the second data processing device 4 into the first data processing device 3. In addition or as an alternative, it is provided that information about the costs for carrying out the method are loaded together with the license data record from the second data processing device 4 into the first data processing device 3.

If the user is in agreement with the costs, method step S12 is carried out. Should the user not be in agreement with the costs, the license data record is erased from the first data processing device 3 and the method is stopped. As an alternative to this, it is envisaged to notify the user of the costs for continuing to carry out the method and then to carry out method step S12.

In method step S12, a second data record is loaded from the data memory 5 into the first data processing device 3 in dependence on the first data record loaded into the second data processing device 4. The second data record has second data which include the following: (i) modification data for modifying imaging errors in dependence on the first imaging parameter of the first imaging system 6, in particular correction data for correcting imaging errors in dependence on the first imaging parameter of the first imaging system 6, and/or (ii) modification data for modifying the data about the object in dependence on the second imaging parameter of the second imaging system 7. With regard to the second data record, reference is made to the comments made further above, which also apply here.

In method step S13, the first data processing device 3 is then used for decrypting the second data record by using the license data record. After method step S13, method step S6 and all of the further method steps that possibly follow on thereafter are carried out.

As already mentioned above, in the exemplary embodiment of the method according to an aspect of the disclosure it is provided that the first data record loaded into the second data processing device 4 has identification data of the data about the object and/or user identification data. In a further exemplary embodiment of the method according to an aspect of the disclosure according to FIG. 12, it is provided that, before carrying out method step S10, in which the license data record is generated, first a check is carried out as to whether an authorization of use exists at all for using the license data record. This exemplary embodiment of the method according to an aspect of the disclosure takes place analogously to the exemplary embodiment shown in FIG. 9. Thus, it is checked on the basis of the identification data and/or the user identification data by using the first data processing device 3 and/or the second data processing device 4 whether an authorization of use exists for using the license data record with the first data processing device 3 and/or the second data processing device 4. The authorization of use may exist for example whenever the user has paid to carry out the method according to an exemplary embodiment of the disclosure, will pay in the near future, has been provided with a line of credit to carry out the method according to the disclosure or has acquired a license for carrying out the method according to an exemplary embodiment of the disclosure. If an authorization of use exists, method step S10 is carried out. If no authorization of use exists, the user is notified of this. In this case, the user can obtain an authorization of use, for example by paying a usage fee for carrying out the method according to an exemplary embodiment of the disclosure or by acquiring a license. If the user does not obtain an authorization of use, the method according to an exemplary embodiment of the disclosure is stopped.

In yet a further exemplary embodiment of the method according to an aspect of the disclosure according to FIG. 12, it is additionally or alternatively provided that, before carrying out method step S12, in which the second data record is loaded from the data memory 5 into the first data processing device 3, first a check is carried out as to whether an authorization of use exists at all for using the license data record. This exemplary embodiment of the method according to an aspect of the disclosure takes place analogously to the exemplary embodiment according to FIG. 10. Thus, first the identification data and/or the user identification data is/are loaded once again from the first data processing device 3 into the second data processing device 4. On the basis of the identification data and/or the user identification data, it is checked by using the second data processing device 4 whether an authorization of use exists for using the license data record with the first data processing device 3 and/or the second data processing device 4. The authorization of use may exist for example whenever the user has paid to carry out the method according to an exemplary embodiment of the disclosure, will pay in the near future, has been provided with a line of credit to carry out the method according to an exemplary embodiment of the disclosure or has acquired a license for carrying out the method according to an exemplary embodiment of the disclosure. If an authorization of use exists, method step S12 is carried out. If no authorization of use exists, the user is notified of this. In this case, the user can obtain an authorization of use, for example by paying a usage fee for carrying out the method according to an exemplary embodiment of the disclosure or by acquiring a license. If the user does not obtain an authorization of use, the method according to an exemplary embodiment of the disclosure is stopped. In addition or as an alternative, it is envisaged to erase the license data record.

Figure 13:
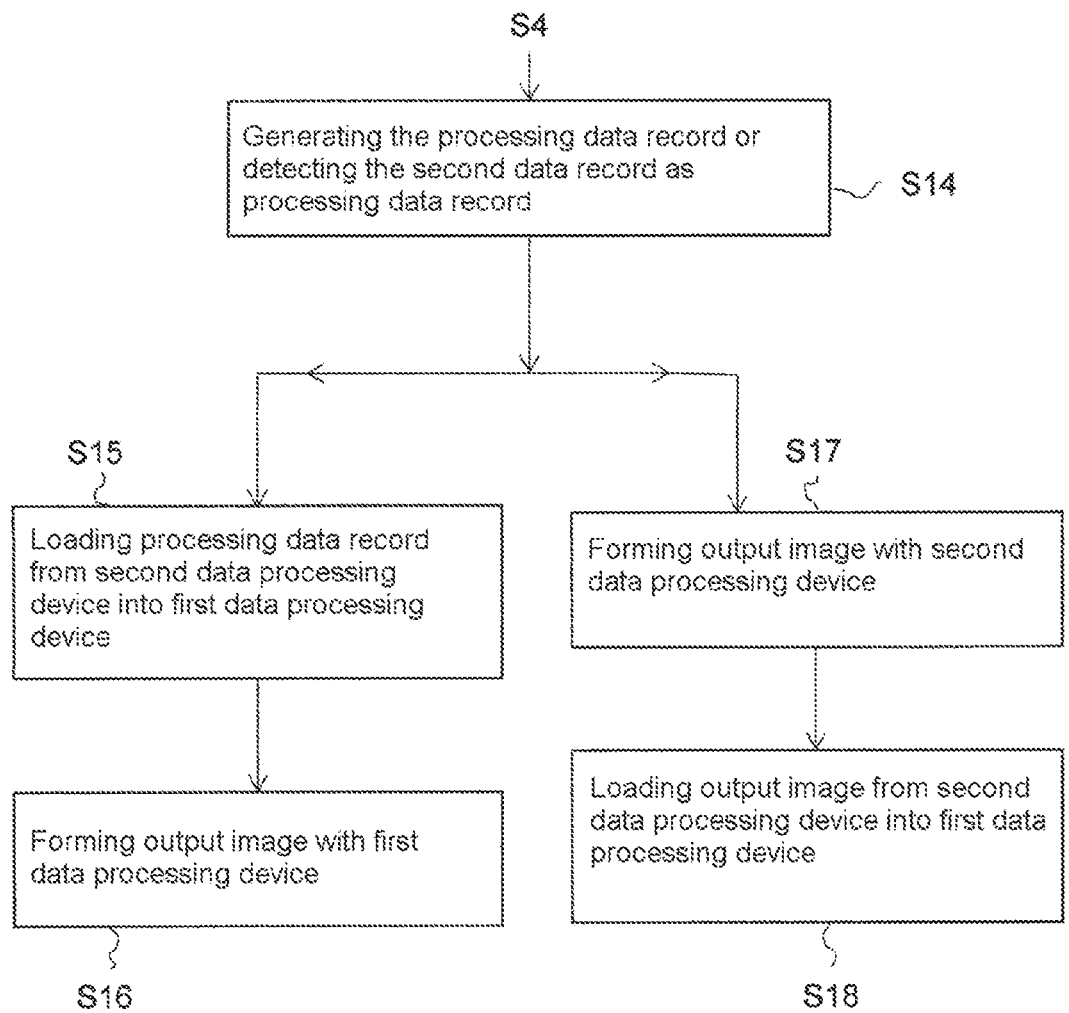
FIG. 13 shows a schematic representation of a flow diagram of the method according to a further exemplary embodiment of the disclosure.

FIG. 13 shows a schematic representation of yet a further exemplary embodiment of the method according to an aspect of the disclosure. The still further exemplary embodiment of the method according to an aspect of the disclosure is based on the exemplary embodiment according to FIG. 4. Therefore, reference is first made to the statements made further above, which also apply here. The further exemplary embodiment according to FIG. 13 likewise has method steps S1 to S4. After method step S4, method step S14 is carried out. In method step S14, the second data processing device 4 is used for generating the processing data record or detecting that the second data record is being used as the processing data record. In addition, it is for example provided that the processing data record is loaded from the second data processing device 4 into the first data processing device 3 (method step S15) and the first data processing device 3 is used for forming the two-dimensional output image of the object (method step S16). As an alternative, it is provided after method step S14 that the second data processing device 4 is used for forming the two-dimensional output image of the object (method step S17) and that the two-dimensional output image is loaded from the second data processing device 4 into the first data processing device 3 (method step S18). With regard to the forming of the output image, reference is made to the comments further above, which also apply here.

The disclosure provides a method and an image forming system 1 for forming an image of an object by which an imaging error or a plurality of imaging errors in actually formed images and/or image sequences can be modified, in particular corrected, in an easy way. For this purpose, the appropriate processing data record with which the imaging error or the number of imaging errors in the actually formed image can be completely or substantially corrected is always provided by the disclosure. In addition, the disclosure ensures that artificially generated representations of an object have no discernible differences, or only just discernible differences, from actually formed images and/or image sequences. Also for this purpose, the appropriate processing data record with which the artificially generated representation of the object can be correspondingly processed is always provided.

The features of the disclosure disclosed in the present description, in the drawings and in the claims may be essential for the realization of the disclosure in the various exemplary embodiments thereof both individually and in arbitrary combinations. The disclosure is not restricted to the described exemplary embodiments. It can be varied within the scope of the claims and taking into account the knowledge of the relevant person skilled in the art.

LIST OF REFERENCE NUMERALS

1 Image forming system
2 Display unit
3 First data processing device
4 Second data processing device
5 Data memory
6 First imaging system
7 Second imaging system
8 First processor
9 Second processor
10 Input image
11 Three-dimensional representation
12A First meta data
12B Second meta data
13A First camera data
13B Second camera data
14A First objective lens data
14B Second objective lens data
15A First stop unit data
15B Second stop unit data
16A First focusing unit data
16B Second focusing unit data
17A First focal-length setting unit data
17B Second focal-length setting unit data
18A First information about position and location
18B Second information about position and location
19A First information about resolution of the first imaging system
19B Second information about resolution of the second imaging system
1000 Camera
1001 Housing
1002 Objective lens
1003 Image capturing unit
1004 First lens unit
1005 Second lens unit
1006 Processor
1007 Monitor
1008 SLAM module
1009 Communications device
1016 Stop unit
1017 XD data interface
O Object
OA Optical axis
D Diameter
D1 First dimension
D2 Second dimension
D3 Third dimension
S1 to S8 Method steps
S10 to S18 Method steps
S3A to S3B Method steps
55A to 55C Method steps
V Voxel

What is claimed is:

1. A method for forming an image of an object, the method comprising:
providing data about the object by a first data processing device;
providing at least a first data record by the first data processing device, the first data record having first data, which comprise at least one of: (i) at least a first imaging parameter of a first imaging system with which the data about the object have been generated, and (ii) at least a second imaging parameter of a second imaging system with properties of which an image of the object is intended to be represented on a display unit based on the data about the object;

loading the first data record from the first data processing device into a second data processing device, wherein the first data record loaded from the first data processing device into the second data processing device has at least one of identification data of the data about the object and user identification data;

loading a second data record from a data memory into the second data processing device in dependence on the first data record loaded into the second data processing device, the second data record having second data, which comprise at least one of: (i) modification data for modifying imaging errors in dependence on the first imaging parameter of the first imaging system, and (ii) modification data for modifying the data about the object in dependence on the second imaging parameter of the second imaging system;

generating a processing data record based on the second data record or detecting that the second data record is being used as the processing data record;

forming a two-dimensional output image of the object by processing the data about the object with the processing data record, the output image having a predeterminable number of output image pixels; and checking based on at least one of the identification data and the user identification data with at least one of the first data processing device and the second data processing device whether an authorization of use exists for using the second data record with at least one of the first data processing device and the second data processing device, and only generating the processing data record if the authorization of use exists.

2. The method according to claim 1, further comprising:
loading the second data record from the second data processing device into the first data processing device; and
generating the processing data record with the first data processing device or detecting that the second data record is being used as the processing data record.

3. The method according to claim 1, further comprising:
forming the two-dimensional output image of the object with the first data processing device.

4. The method according to claim 1, further comprising:
generating the processing data record with the second data processing device or detecting that the second data record is being used as the processing data record.

5. The method according to claim 4, further comprising:
loading the processing data record from the second data processing device into the first data processing device and forming the two-dimensional output image of the object with the first data processing device; and
generating the two-dimensional output image of the object with the second data processing device and loading the two-dimensional output image from the second data processing device into the first data processing device.

6. The method according to claim 1, wherein:
the data about the object comprise at least one two-dimensional input image of the object,
the input image of the object has a predetermined number of input image pixels, and
during the forming of the output image of the object, at least one input image pixel of the predetermined number of input image pixels of the input image of the object is processed by using the processing data record, pixel values of the input image pixel of the input image of the object being modified with data of the processing data record.

7. The method according to claim 1, wherein:
the data about the object concern at least one three-dimensional representation,
the data about the object comprise first data contents in a first dimension, second data contents in a second dimension, and third data contents in a third dimension, and
during the forming of the output image of the object, at least one of the first data content, the second data content, and the third data content is/are processed with the processing data record, with at least one of the first data content, the second data content, and the third data content being modified with data of the processing data record.

8. The method according to claim 1, wherein the first imaging system is a first optical imaging system.

9. The method according to claim 1, wherein the first imaging parameter is at least one of the following parameters of the first imaging system:
first meta data of the first imaging system,
first camera data about a first camera with which the data about the object have been generated,
first objective lens data about a first objective lens with which the data about the object have been generated,
first stop-unit data about a first stop unit with which the data about the object have been generated,
first focusing unit data about a first focusing unit with which the data about the object have been generated,
first focal-length setting unit data about a first focal-length setting unit with which the data about the object have been generated,
first information about a position and a location of the first imaging system in space, and
first information about at least one of a resolution of the first imaging system and about a desired target resolution.

10. The method according to claim 1, wherein the second imaging system is a second optical imaging system.

11. The method according to claim 1, wherein the second imaging parameter is at least one of the following parameters of the second imaging system:
second meta data of the second optical imaging system,
second camera data about a second camera with the properties of which the data about the object are intended to be represented on the display unit,
second objective lens data about a second objective lens with the properties of which the data about the object are intended to be represented on the display unit,
second stop unit data about a second stop unit with the properties of which the data about the object are intended to be represented on the display unit,
second focusing unit data about a second focusing unit with the properties of which the data about the object are intended to be represented on the display unit,
second focal-length setting unit data about a second focal-length setting unit with the properties of which the data about the object are intended to be represented on the display unit,
second information about a position and a location of the second imaging system in space, second information about at least one of a resolution of the first imaging system and about a desired target resolution.

12. The method according to claim 1, further comprising at least one of:
applying data for modifying a distortion of the first imaging system as modification data;
applying data for modifying vignetting of the first imaging system as modification data;
applying data for correcting a distortion of the first imaging system as modification data; and
applying data for correcting vignetting of the first imaging system as modification data.

13. The method according to claim 1, further comprising at least one of:
providing a virtual camera as the second imaging system, forming an image of the object with the virtual camera by mathematical calculation based on the data about the object such that as though a camera which has the property chosen by the second imaging parameter were actually imaging the object;
providing a mathematical mapping rule, which represents the virtual camera and describes in a mathematical form how and where a light beam entering an objective lens of the virtual camera and emerging again from the objective lens is imaged on an image capturing unit of the virtual camera, as the second data record;
providing a polynomial, which represents the virtual camera and describes in a mathematical form how and where a light beam entering an objective lens of the virtual camera and emerging again from the objective lens is imaged on an image capturing unit of the virtual camera, as the second data record; and
providing a Fourier development, which represents the virtual camera and describes in a mathematical form how and where a light beam entering an objective lens of the virtual camera and emerging again from the objective lens is imaged on an image capturing unit of the virtual camera, as the second data record.

14. The method according to claim 1, further comprising:
loading at least one of the identification data and the user identification data once again from the first data processing device into the second data processing device;
checking based on at least one of the identification data and the user identification data with the second data processing device whether an authorization of use exists for using at least one of the second data record with the first data processing device and the second data processing device, and
only generating the processing data record if the authorization of use exists.

15. The method according to claim 1, wherein:
the second data of the second data record comprise modification data for modifying the formed output image of the object for incorporating imaging errors in the output image of the object in dependence on the first imaging parameter of the first imaging system,
after being formed or detected, the processing data record has processing data based on the modification data; and
the method further comprises:
modifying the output image of the object by processing at least one output image pixel of the predeterminable number of output image pixels of the output image of the object with at least one of the first data processing device and the second data processing device with the processing data, pixel values of the output image pixel of the output image of the object being modified with the processing data.

16. A non-transitory computer-readable storage medium with a program code stored thereon which can be loaded into a processor of an image forming system and, when it has been loaded in the processor, during its execution controls the image forming system such that the method according to claim 1 is carried out.

17. An image forming system for forming an image of an object, the image forming system comprising:
a display unit;
a first imaging system;
a second imaging system;
a first data processing device configured to provide data about the object and to provide a first data record, which has first data, which comprise at least one of: (i) at least a first imaging parameter of the first imaging system with which the data about the object have been generated, and (ii) at least a second imaging parameter of the second imaging system with the properties of which an image of the object is intended to be represented on the display unit based on the data about the object;
a second data processing device connected to the first data processing device for data exchange;
a data memory, in which a second data record is stored, and wherein the second data record has second data, which comprise at least one of: (i) modification data for modifying imaging errors in dependence on the first imaging parameter of the first imaging system, and (ii) modification data for modifying the data about the object in dependence on the second imaging parameter of the second imaging system; and
at least one processor, in which the program code according to claim 16 is loaded.

18. The image forming system according to claim 17, wherein at least one of:
the first imaging system is formed as a first optical imaging system; and
the second imaging system is formed as a second optical imaging system.

19. The image forming system according to claim 17, wherein the first imaging system has at least one of:
a first camera,
a first objective lens,
a first stop unit,
a first focusing unit, and
a first focal-length setting unit.

20. The image forming system according to claim 17, wherein the second imaging system has at least one of:
a second camera,
a second objective lens,
a second stop unit,
a second focusing unit, and
a second focal-length setting unit.

21. The image forming system according to claim 17, wherein at least one of:
the second imaging system is a virtual camera configured to form an image of the object by mathematical calculation based on the data about the object such that as though a camera which has the property chosen by the second imaging parameter were actually imaging the object,
the second data record is formed as a mathematical mapping rule, which represents the virtual camera and describes in a mathematical form how and where a light beam entering an objective lens of the virtual camera and emerging again from the objective lens is imaged on an image capturing unit of the virtual camera, the second data record is formed as a polynomial, which represents the virtual camera and describes in a mathematical form how and where a light beam entering an objective lens of the virtual camera and emerging again from the objective lens is imaged on an image capturing unit of the virtual camera, and the second data record is formed as a Fourier development, which represents the virtual camera and describes in a mathematical form how and where a light beam entering an objective lens of the virtual camera and emerging again from the objective lens is imaged on an image capturing unit of the virtual camera.

22. A method for forming an image of an object, the method comprising:

providing data about the object by a first data processing device;

providing at least a first data record by the first data processing device, the first data record having first data, which comprise at least one of: (i) at least a first imaging parameter of a first imaging system with which the data about the object have been generated, and (ii) at least a second imaging parameter of a second imaging system with the properties of which an image of the object is intended to be represented on a display unit based on the data about the object;

loading the first data record from the first data processing device into a second data processing device;

generating a license data record in dependence on the first data record loaded into the second data processing device;

loading the license data record from the second data processing device into the first data processing device;

loading a second data record from a data memory into the first data processing device in dependence on the first data record loaded into the second data processing device, the second data record having second data, which comprise at least one of: (i) modification data for modifying imaging errors in dependence on the first imaging parameter of the first imaging system, and (ii) modification data for modifying the data about the object in dependence on the second imaging parameter of the second imaging system;

decrypting the second data record with the license data record;

generating a processing data record with the first data processing device based on the second data record or detecting with the first data processing device that the second data record is being used as the processing data record; and forming a two-dimensional output image of the object by processing the data about the object with the processing data record, the output image having a predeterminable number of output image pixels.

* * * * *